(12) United States Patent
Imai et al.

(10) Patent No.: US 9,570,755 B2
(45) Date of Patent: Feb. 14, 2017

(54) PRODUCTION PROCESS FOR ELECTRODE CATALYST FOR FUEL CELL AND USES THEREOF

(75) Inventors: Takuya Imai, Tokyo (JP); Kazunori Ichioka, Tokyo (JP); Chunfu Yu, Tokyo (JP); Yasuaki Wakizaka, Tokyo (JP); Takashi Sato, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 444 days.

(21) Appl. No.: 13/996,124

(22) PCT Filed: Dec. 19, 2011

(86) PCT No.: PCT/JP2011/079395
§ 371 (c)(1),
(2), (4) Date: Jun. 20, 2013

(87) PCT Pub. No.: WO2012/086597
PCT Pub. Date: Jun. 28, 2012

(65) Prior Publication Data
US 2013/0280639 A1    Oct. 24, 2013

(30) Foreign Application Priority Data
Dec. 22, 2010   (JP) .................... 2010-285729

(51) Int. Cl.
*H01M 4/86* (2006.01)
*H01M 4/88* (2006.01)
*H01M 4/90* (2006.01)
*H01M 8/10* (2016.01)

(52) U.S. Cl.
CPC ......... *H01M 4/8652* (2013.01); *H01M 4/8825* (2013.01); *H01M 4/8885* (2013.01); *H01M 4/9016* (2013.01); *H01M 4/9083* (2013.01); *H01M 2008/1095* (2013.01); *Y02E 60/50* (2013.01)

(58) Field of Classification Search
CPC .............................. H01M 4/86; H01M 4/8652
USPC .................................................. 429/482, 531
See application file for complete search history.

(56) References Cited

U.S. PATENT DOCUMENTS

2006/0188775 A1    8/2006   Mance et al.
2007/0060471 A1    3/2007   Zhou et al.
(Continued)

FOREIGN PATENT DOCUMENTS

CN     1824385 A     8/2006
CN     101306385 A   11/2008
(Continued)

OTHER PUBLICATIONS

Nallathambi, Vijayadurga et al., "Development of high performance carbon composite catalyst for oxygen reduction reaction in PEM Proton Exchange Membrane fuel cells", Journal of Power Sources 183 (2008) 34-42.*
(Continued)

*Primary Examiner* — Karie O'Neill Apicella
(74) *Attorney, Agent, or Firm* — Sughrue Mion, PLLC

(57) ABSTRACT

A production process for an electrode catalyst for a fuel cell, which includes a step (I) of mixing a nitrogen-containing organic substance, a transition metal compound and conductive particles with a solvent and a step (II) of calcining a mixture obtained in the step (I).

16 Claims, 9 Drawing Sheets

(56) References Cited

U.S. PATENT DOCUMENTS

| | | | |
|---|---|---|---|
| 2009/0130502 A1* | 5/2009 | Liu | H01M 4/9008 |
| | | | 429/483 |
| 2009/0312181 A1 | 12/2009 | Do et al. | |
| 2010/0062928 A1 | 3/2010 | Jin et al. | |
| 2010/0086823 A1 | 4/2010 | Koshino et al. | |
| 2010/0227253 A1 | 9/2010 | Monden et al. | |
| 2011/0008709 A1 | 1/2011 | Shishikura et al. | |
| 2011/0020729 A1 | 1/2011 | Monden et al. | |
| 2011/0183234 A1 | 7/2011 | Wakizaka et al. | |
| 2011/0229793 A1 | 9/2011 | Kurozumi et al. | |
| 2012/0083407 A1 | 4/2012 | Shishikura et al. | |

FOREIGN PATENT DOCUMENTS

| | | | | |
|---|---|---|---|---|
| CN | 101322948 A | 12/2008 | | |
| CN | 102299347 A | 12/2011 | | |
| EP | 2 136 426 A1 | 12/2009 | | |
| EP | 2136426 A1 * | 12/2009 | | H01M 4/90 |
| EP | 2 198 962 A1 | 6/2010 | | |
| EP | 2 251 081 A1 | 11/2010 | | |
| EP | 2 258 475 A1 | 12/2010 | | |
| JP | 2005-63749 A | 3/2005 | | |
| JP | 2006-181541 A | 7/2006 | | |
| JP | 2007-257888 A | 10/2007 | | |
| JP | 2007-273371 A | 10/2007 | | |
| JP | 2008-251413 A | 10/2008 | | |
| JP | 2009-148706 A | 7/2009 | | |
| WO | 2008-072595 A1 | 6/2008 | | |
| WO | 2009-017011 A1 | 2/2009 | | |
| WO | 2010-041658 A1 | 4/2010 | | |
| WO | 2010-140612 A1 | 12/2010 | | |

OTHER PUBLICATIONS

Fengxiang Yin, et al.; "Improved catalytic performance of nitrided Co—Ti and Fe—Ti catalysts for oxygen reduction as non-noble metal cathodes in acidic media"; Electrochemistry Communications; vol. 12; Issue 9; Sep. 2010; pp. 1177-1179.
Journal of Power Sources 183 (2008) pp. 34-42: "Development of high performance carbon composite catalyst for oxygen reduction reaction in PEM Proton Exchange Membrane fuel cells".
Communication dated Feb. 2, 2015 from the European Patent Office in counterpart European Application No. 11852004.8.
Extended European Search Report dated May 21, 2014 for corresponding European Application No. 11852004.8.
Communication dated Aug. 1, 2016, from the State Intellectual Property Office of the P.R.C. in corresponding Chinese application No. 201180060909.0

* cited by examiner

50nm 50 nm 50 nm 50 nm

PRODUCTION PROCESS FOR ELECTRODE CATALYST FOR FUEL CELL AND USES THEREOF

CROSS REFERENCE TO RELATED APPLICATIONS

This application is a National Stage of International Application No. PCT/JP2011/079395, filed on Dec. 19, 2011, which claims priority from Japanese Patent Application No. 2010-285729, filed on Dec. 22, 2010, the contents of all of which are incorporated herein by reference in their entirety.

TECHNICAL FIELD

The present invention relates to a production process for an electrode catalyst for a fuel cell and uses thereof. More particularly, the present invention relates to a production process for an electrode catalyst for a fuel cell by which a catalyst having smaller particle diameters and exhibiting higher performance than in conventional production processes is obtained, and a fuel cell containing the catalyst.

BACKGROUND ART

Solid polymer type fuel cells are fuel cells in which a solid polymer solid electrolyte is interposed between an anode and a cathode and from which electricity is taken out by the mechanism that a fuel is supplied to the anode, oxygen or air is supplied to the cathode, and oxygen is reduced in the cathode. As the fuel, hydrogen, methanol or the like is mainly used.

In order to increase a reaction rate of a fuel cell and enhance energy conversion efficiency of a fuel cell, a layer containing a catalyst (also referred to as a "catalyst layer for fuel cell" hereinafter) has been provided on a cathode (air electrode) surface or an anode (fuel electrode) surface of the fuel cell in the past.

As the catalyst, a precious metal is generally used, and of such precious metals, precious metals that are stable at high potentials and have high activity, such as platinum and palladium, have been mainly used. However, prices of these precious metals are high and their resource quantity has a limit, and therefore, development of substitutable catalysts has been desired.

Moreover, there are problems that the precious metals used for the cathode surface sometimes dissolve in an acidic atmosphere and they are unsuitable for uses that need durability over a long period of time. On this account, development of catalysts that are not corroded in an acidic atmosphere, have excellent durability and have a high oxygen reduction ability has been eagerly desired.

Under such circumstances as above, studies of transition metal compounds, particularly transition metal carbonitrooxides, as the substitute catalysts for precious metals, have been promoted. These transition metal materials are inexpensive and their resources are abundant as compared with the precious metal materials such as platinum.

The conventional production process for transition metal carbonitrooxides is generally a process in which a transition metal compound and compounds capable of becoming a carbon source, a nitrogen source and an oxygen source are calcined. By mixing a transition metal carbonitrooxide produced by such a production process with carbon black or the like, a catalyst for a fuel cell is obtained.

In the case of using a transition metal carbonitrooxide produced by the above production process, an electrode catalyst for a fuel cell exhibiting performance of a certain level has been obtained, but an electrode catalyst for a fuel cell exhibiting practically satisfactory performance has not been necessarily obtained.

In a patent literature 1, a method to support a metal oxide on carbon has been reported. This method, however, is a method for producing carbon having excellent durability, not a method for producing an electrode catalyst for a fuel cell using a substitute for a precious metal.

In a non patent literature 1, a production process for a catalyst supported on carbon particles using a polymer complex method has been reported.

In the production process described in the non patent literature 1, however, a nitrogen-containing organic compound is not used as the organic compound contained, and an electrode catalyst for a fuel cell exhibiting satisfactory performance has not been obtained.

CITATION LIST

Patent Literature

Patent literature 1: Japanese Patent laid-Open Publication No. 2008-251413

Non Patent Literature

Non patent literature 1: Electrochemistry Communications 12 (2010), 1177-1179

SUMMARY OF INVENTION

Technical Problem

The present invention is intended to solve such problems associated with the prior art as mentioned above. That is to say, it is an object of the present invention to provide a production process for an electrode catalyst for a fuel cell, said electrode catalyst using a transition metal and having smaller particle diameters and a higher catalytic activity than in a conventional production process.

Solution to Problem

In order to solve the above problems associated with the prior art, the present inventors have earnestly studied. As a result, they have found that by mixing conductive particles such as carbon black in the calcining of a nitrogen-containing organic substance and a transition metal compound to produce an electrode catalyst for a fuel cell, an electrode catalyst for a fuel cell having a high catalytic activity is obtained with high efficiency, and they have accomplished the present invention.

The present invention relates to, for example, the following matters (1) to (18).

(1) A production process for an electrode catalyst for a fuel cell, comprising a step (I) of mixing a nitrogen-containing organic substance, a transition metal compound and conductive particles with a solvent and a step (II) of calcining a mixture obtained in the step (I).

(2) The production process for an electrode catalyst for a fuel cell as stated in the above (1), wherein the conductive particle is carbon black.

(3) The production process for an electrode catalyst for a fuel cell as stated in the above (2), wherein the molar ratio of carbon black to the total sum of the transition metal compound in the step (I) is 1 to 15.

(4) The production process for an electrode catalyst for a fuel cell as stated in any one of the above (1) to (3), wherein the nitrogen-containing organic substance has, in a molecule, one or more kinds selected from an amine group, a nitrile group, an imide group, an imine group, a nitro group, an amide group, an azide group, an aziridine group, an azo group, an isocyanate group, an isothiocyanate group, an oxime group, a diazo group, a nitroso group, a pyrrole ring, a porphyrin ring, an imidazole ring, a pyridine ring, a pyrimidine ring and a pyrazine ring.

(5) The production process for an electrode catalyst for a fuel cell as stated in any one of the above (1) to (4), wherein the nitrogen-containing organic substance has, in a molecule, one or more kinds selected from a hydroxyl group, a carboxyl group, an aldehyde group, an acid halide group, a sulfo group, a phosphoric acid group, a ketone group, an ether group and an ester group.

(6) The production process for an electrode catalyst for a fuel cell as stated in any one of the above (1) to (5), wherein the molar ratio of the nitrogen-containing organic substance to the total sum of the transition metal compound in the step (I) is 0.1 to 10.

(7) The production process for an electrode catalyst for a fuel cell as stated in any one of the above (1) to (6), wherein the metal of the transition metal compound is at least one metal selected from the group consisting of titanium, vanadium, chromium, manganese, iron, cobalt, copper, zirconium, niobium, tantalum and tungsten.

(8) The production process for an electrode catalyst for a fuel cell as stated in any one of the above (1) to (6), wherein the transition metal compound is a compound of at least two transition metals, and one of the transition metals is selected from the group consisting of titanium, zirconium, niobium and tantalum, and the other is selected from the group consisting of vanadium, chromium, manganese, iron, cobalt, copper and tungsten.

(9) The production process for an electrode catalyst for a fuel cell as stated in any one of the above (1) to (8), wherein the step (I) is a step in which the nitrogen-containing organic substance, the transition metal compound and the conductive particles are mixed with the solvent to obtain a catalyst precursor mixed liquid, and thereafter, the solvent is removed from the catalyst precursor mixed liquid to obtain the mixture.

(10) The production process for an electrode catalyst for a fuel cell as stated in the above (9), wherein a suspending agent comprising a compound having a diketone structure is mixed with the catalyst precursor mixed liquid.

(11) The production process for an electrode catalyst for a fuel cell as stated in the above (9) or (10), wherein the step (I) is a step in which a solution obtained by mixing the transition metal compound with the solvent is mixed with the suspending agent, subsequently mixed with the nitrogen-containing organic substance and then mixed with the conductive particles to obtain the catalyst precursor mixed liquid, and thereafter, the solvent is removed from the catalyst precursor mixed liquid to obtain the mixture.

(12) The production process for an electrode catalyst for a fuel cell as stated in any one of the above (1) to (11), wherein the transition metal compound is a transition metal compound containing an oxygen atom in a molecule.

(13) An electrode catalyst for a fuel cell, which is obtained by the production process as stated in any one of the above (1) to (12).

(14) A catalyst layer for a fuel cell, which comprises the electrode catalyst for a fuel cell as stated in the above (13).

(15) An electrode having the catalyst layer for a fuel cell as stated in the above (14) and a gas diffusion layer.

(16) A membrane electrode assembly comprising a cathode, an anode and an electrolyte membrane arranged between the cathode and the anode, wherein the cathode and/or the anode is the electrode as stated in the above (15).

(17) A fuel cell having the membrane electrode assembly as stated in the above (16).

(18) A solid polymer type fuel cell having the membrane electrode assembly as stated in the above (16).

Advantageous Effects of Invention

According to the production process for an electrode catalyst for a fuel cell of the present invention, an electrode catalyst for a fuel cell, which has smaller particle diameters and a higher catalytic activity than in a conventional production process, can be produced. Therefore, the electrode catalyst for a fuel cell produced by the production process for an electrode catalyst for a fuel cell of the present invention has high reaction efficiency. Moreover, a catalyst layer for a fuel cell using this electrode catalyst for a fuel cell has a high catalytic ability, and therefore, a fuel cell having this catalyst layer for a fuel cell has very excellent power generation properties.

DESCRIPTION OF EMBODIMENTS

Figure 1:
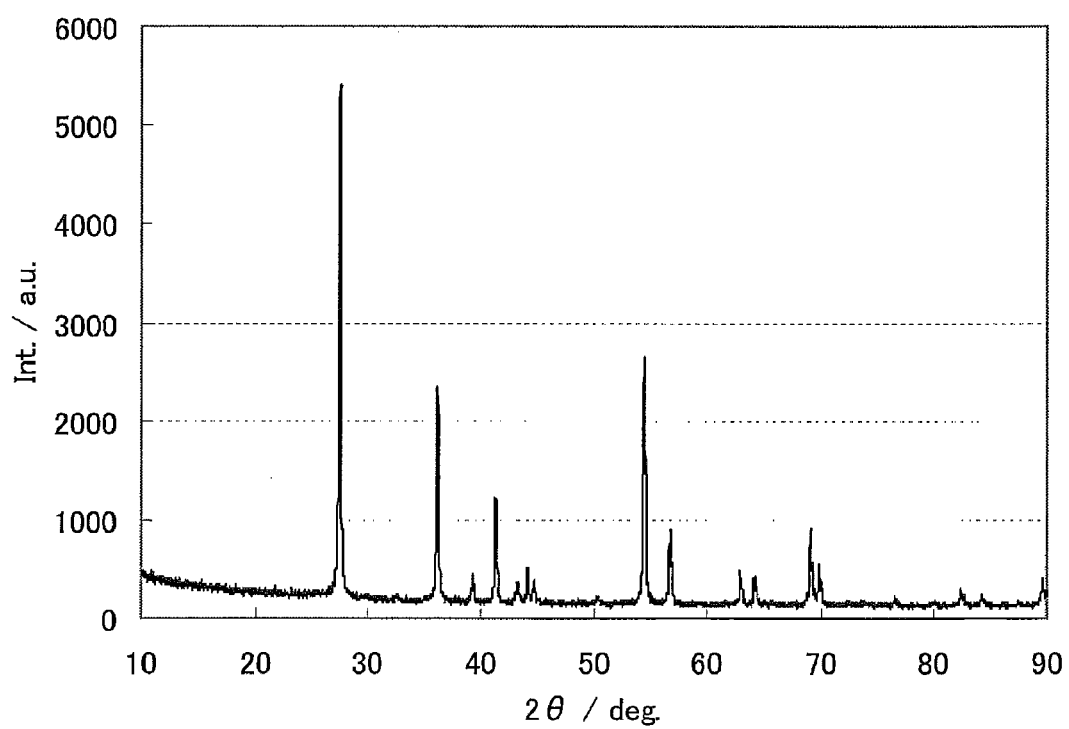
FIG. 1 is a powder X-ray diffraction spectrum of a catalyst (1).

<Production Process for Electrode Catalyst for Fuel Cell>

The production process for an electrode catalyst for a fuel cell of the present invention is characterized by comprising a step (I) of mixing a nitrogen-containing organic substance, a transition metal compound and conductive particles with a solvent and a step (II) of calcining a mixture obtained in the step (I).

In the conventional production process for an electrode catalyst for a fuel cell, a nitrogen-containing organic substance and a transition metal compound are mixed, and the resulting mixture is calcined. The electrode catalyst for a fuel cell produced by this conventional production process did not exhibit practically sufficient performance. In general, it is known that an electrode catalyst for a fuel cell having smaller particle diameters has a higher catalytic ability. The reason why an electrode catalyst for a fuel cell exhibiting sufficiently high performance cannot be obtained in the conventional production process is thought to be that the particle diameters of the electrode catalyst for a fuel cell cannot be sufficiently reduced by the conventional production process. Even if the electrode catalyst for a fuel cell produced by the conventional production process is pulverized and then mixed with carbon black or the like, or even if the electrode catalyst for a fuel cell produced by the conventional production process is mixed with carbon black or the like and then pulverized, there is limitation on the reduction of the particle diameters of the electrode catalyst for a fuel cell, and therefore, it is difficult to obtain an electrode catalyst for a fuel cell exhibiting practically satisfactorily high performance.

In contrast with this, when the conductive particles such as carbon black are mixed in the calcining of the nitrogen-containing organic substance and the transition metal compound, an electrode catalyst for a fuel cell having extremely small particle diameters is produced. As a result, the electrode catalyst for a fuel cell obtained by the production process of the present invention is thought to have a high catalytic activity.

The reason why an electrode catalyst for a fuel cell having small particle diameters is obtained by mixing the conductive particles such as carbon black in the calcining of the nitrogen-containing organic substance and the transition metal compound is thought to be that the transition metal is highly dispersed on the carbon black surface in the preparation of a raw material, and therefore, grain growth is inhibited in the calcining. On the other hand, it is thought that if conductive particles such as carbon black are not mixed, the transition metal that becomes a nucleus is not dispersed and is present in a large amount in the narrow range, so that grain growth rapidly proceeds and the particle diameters become larger.

Step (I)

The step (I) is a step of mixing a nitrogen-containing organic substance, a transition metal compound and conductive particles with a solvent, and this step preferably contains a step (i) of mixing a transition metal compound, a nitrogen-containing organic substance, conductive particles and a solvent with one another to obtain a mixed liquid (also referred to as a "catalyst precursor mixed liquid" in the present invention) and a step (ii) of removing the solvent from the catalyst precursor mixed liquid. If at least one of the nitrogen-containing organic substance, the transition metal compound, the conductive particles and the solvent has an oxygen atom in the step (I), an electrode catalyst for a fuel cell having a carbon atom, a nitrogen atom and an oxygen atom as constituent atoms can be produced, and this electrode catalyst for a fuel cell is preferable because it has a higher catalytic activity.

<Transition Metal Compound>

The transition metal compound is a compound of at least one transition metal. When the transition metal compound is a compound of one transition metal, the transition metal is selected from the group consisting of titanium, vanadium, chromium, manganese, iron, cobalt, copper, zirconium, niobium, tantalum and tungsten. When the transition metal compound is a compound of two transition metals, one transition metal of them is selected from the group consisting of titanium, zirconium, niobium and tantalum, and the other transition metal is selected from the group consisting of vanadium, chromium, manganese, iron, cobalt, copper and tungsten.

The transition metal compound preferably has at least one atom selected from an oxygen atom and a halogen atom. As the transition metal compound having an oxygen atom, an oxide, an alkoxide, an acetylacetone complex, an acid chloride or a sulfate is preferable. From the viewpoint of cost, an oxide, an alkoxide or an acetylacetone complex is more preferable, and from the viewpoint of solubility in the solvent in the liquid phase, an alkoxide or an acetylacetone complex is still more preferable.

Examples of the transition metal compounds include metal phosphates, metal sulfates, metal nitrates, metal organic acid salts, metal acid halides (intermediate hydrolyzates of metal halides), metal alkoxides, metal halides, metal perhalogen acid salts, metal halogen acid salts, metal hypohalous acid salts and metal complexes. These may be used singly, or may be used in combination of two or more kinds.

As the metal alkoxides, methoxides, propoxides, isopropoxides, ethoxides, butoxides and isobutoxides of the aforesaid transition metals are preferable, and isopropoxides, ethoxides and butoxides of the aforesaid transition metals are more preferable. The metal alkoxides may have one alkoxy group, or may have two or more alkoxy groups.

As the metal halides, chlorides, bromides and iodides of the aforesaid transition metals are preferable, and as the metal acid halides, acid chlorides, acid bromides and acid iodides of the aforesaid transition metals are preferable.

Of these, one or more transition metal compounds selected from the group consisting of metal nitrates, metal organic acid salts, metal acid chlorides, metal alkoxides, metal halides, metal perchlorates, metal hypochlorites and metal complexes are preferable.

Specific examples of the transition metal compounds include:

titanium compounds, such as titanium dioxide, titanium oxide having 1 or more but 2 or less oxygen atoms based on one titanium atom, titanium tetramethoxide, titanium tetraethoxide, titanium tetrapropoxide, titaniumtetraisopropoxide, titaniumtetrabutoxide, titanium tetraisobutoxide, titanium tetrapentoxide, titanium tetraacetylacetonate, titanium oxydiacetylacetonate, tris(acetylacetonato) titanium(II) chloride, titanium tetrachloride, titanium trichloride, titanium oxychloride, titanium tetrabromide, titanium tribromide, titanium oxybromide, titanium tetraiodide, titanium triiodide and titanium oxyiodide;

niobium compounds, such as niobium pentoxide, niobium oxide having 2.5 or less oxygen atoms based on one niobium atom, niobium pentamethoxide, niobium pentaethoxide, niobium pentaisopropoxide, niobiumpentabutoxide, niobiumpentapentoxide, niobiumpentachloride, niobium oxychloride, niobium pentabromide, niobium oxybromide, niobium pentaiodide and niobium oxyiodide;

zirconium compounds, such as zirconiumdioxide, zirconiumoxide having 1 or more but 2 or less oxygen atoms based on one zirconium atom, zirconium tetramethoxide, zirconium tetraethoxide, zirconium tetrapropoxide, zirconium tetraisopropoxide, zirconium tetrabutoxide, zirconiumtetraisobutoxide, zirconiumtetrapentoxide, zirconium tetraacetylacetonate, zirconium tetrachloride, zirconium oxychloride, zirconiumtetrabromide, zirconiumoxybromide, zirconium tetraiodide and zirconium oxyiodide; and tantalum compounds, such as tantalum pentoxide, tantalum oxide having 2.5 or less oxygen atoms based on one tantalum atom, tantalum pentamethoxide, tantalum pentaethoxide, tantalum pentaisopropoxide, tantalum pentabutoxide, tantalum pentapentoxide, tantalum tetraethoxyacetylacetonate, tantalum pentachloride, tantalum oxychloride, tantalum pentabromide, tantalum oxybromide, tantalum pentaiodide and tantalum oxyiodide.

Further, there can be mentioned:

iron compounds, such as iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron (II) nitrate, iron(III) nitrate, iron(II) oxalate, iron(III) oxalate, iron(II) phosphate, iron(III) phosphate, ferrocene, iron(II) hydroxide, iron(III) hydroxide, iron(II) oxide, iron (III) oxide, triiron tetraoxide, iron(II)acetate, iron(II) lactate and iron(III) citrate;

chromium compounds, such as chromium(II) chloride, chromium(III) chloride, chromium(III) sulfate, chromium (III) sulfide, chromium(III) nitrate, chromium(III) oxalate, chromium(III) phosphate, chromium(III) hydroxide, chromium(II) oxide, chromium(III) oxide, chromium(IV) oxide, chromium(VI) oxide, chromium(II) acetate, chromium(III) acetate and chromium(III) lactate:

cobalt compounds, such as cobalt(II) chloride, cobalt(III) chloride, cobalt(II) sulfate, cobalt(II) sulfide, cobalt(II) nitrate, cobalt(III) nitrate, cobalt(III) oxalate, cobalt(II) phosphate, cobaltocene, cobalt(II) hydroxide, cobalt(II) oxide, cobalt(III) oxide, tricobalt tetraoxide, cobalt(II) acetate and cobalt(II) lactate;

vanadium compounds, such as vanadium(II) chloride, vanadium(III) chloride, vanadium(IV) chloride, vanadium (IV) oxysulfate, vanadium(III) sulfide, vanadium(IV) oxyoxalate, vanadium metallocene, vanadium(V) oxide, vanadium acetate and vanadium citrate; and manganese compounds, such as manganese(II) chloride, manganese(II) sulfate, manganese(II) sulfide, manganese(II) nitrate, manganese(II) oxalate, manganese(II) hydroxide, manganese(II) oxide, manganese(III) oxide, manganese(II) acetate, manganese(II) lactate and manganese citrate.

These may be used singly, or may be used in combination of two or more kinds. Since the resulting catalyst is composed of fine particles of uniform particle diameters and has a high activity, preferred compounds among the above compounds are:

titanium tetraethoxide, titanium tetrachloride, titanium oxychloride, titanium tetraisopropoxide, titanium tetraacetylacetonate, niobium pentaethoxide, niobium pentachloride, niobium oxychloride, niobium pentaisopropoxide, zirconium tetraethoxide, zirconium tetrachloride, zirconium oxychloride, zirconium tetraisopropoxide, zirconium tetraacetylacetonate, tantalum pentamethoxide, tantalum pentaethoxide, tantalum pentachloride, tantalum oxychloride, tantalum pentaisopropoxide, tantalum tetraethoxyacetylacetonate, iron(II) chloride, iron(III) chloride, potassium ferrocyanide, potassium ferricyanide, ammonium ferrocyanide, ammonium ferricyanide, iron(II) acetate, iron(II) lactate, chromium(II) chloride, chromium(III) chloride, chromium(II) acetate, chromium(III) acetate, chromium(III) lactate, cobalt(II) chloride, cobalt(III) chloride, cobalt(II) acetate, cobalt(II) lactate, vanadium(II) chloride, vanadium(III) chloride, vanadium(IV) chloride, vanadium(IV) oxysulfate, vanadium acetate, vanadium citrate, manganese(II) chloride, manganese(II) acetate and manganese(II) lactate. More preferable are titanium tetraisopropoxide, titanium tetraacetylacetonate, niobium ethoxide, niobium isopropoxide, zirconium oxychloride, zirconium tetraisopropoxide, tantalum pentaisopropoxide, iron(II) chloride, iron(III) chloride, potassium ferrocyanide, potassium ferricyanide, ammonium ferrocyanide, ammonium ferricyanide, iron(II) acetate, iron (II) lactate, chromium(II) chloride, chromium(III) chloride, chromium(II) acetate, chromium(III) acetate and chromium (III) lactate.

Further, together with a first transition metal compound containing a transition metal element selected from the group consisting of titanium, zirconium, niobium and tantalum, a second transition metal compound containing at least one transition metal element selected from iron, chromium, cobalt, vanadium, manganese, copper and tungsten may be used in combination as the transition metal compound. When the second transition metal compound is used, performance of the resulting catalyst is enhanced.

Through the observation of an XPS spectrum of the catalyst, it is presumed that when a transition metal element M2 contained in the second transition metal compound is used as the transition metal element, bond formation between the transition metal element M1 (e.g., titanium) contained in the first transition metal compound and a nitrogen atom is accelerated, and as a result, performance of the catalyst is enhanced.

As the transition metal element M2 in the second transition metal compound, iron or chromium is preferable, and iron is more preferable, from the viewpoint of a balance between the cost and the performance of the resulting catalyst.

<Nitrogen-Containing Organic Substance>

As the nitrogen-containing organic substance, a compound capable of becoming a ligand that can be coordinated to the metal atom in the transition metal compound is preferable, and a compound capable of forming a complex of a single nucleus is more preferable. Further, a compound capable of becoming a multidentate ligand, that is, a compound capable of forming a chelate is preferable, and in particular, a compound capable of becoming a bidentate ligand or a tridentate ligand is more preferable. If the nitrogen-containing organic substance is a compound capable of forming a chelate, there are advantages that the compound undergoes complex formation together with the metal, and the metal and the organic substance are uniformly dispersed on a molecular level. Examples of the compounds capable of forming a chelate include amino acids, amine compounds, diketone compounds, amino alcohol, phenol derivatives and heterocyclic compounds.

The nitrogen-containing organic substances may be used singly, or may be used in combination of two or more kinds.

The nitrogen-containing organic substances have functional groups, such as amino group, nitrile group, imide group, imine group, nitro group, amide group, azide group, aziridine group, azo group, isocyanate group, isothiocyanate group, oxime group, diazo group and nitroso group, or rings, such as pyrrole ring, porphyrin ring, imidazole ring, pyridine ring, pyrimidine ring and pyrazine ring (these functional groups and rings are also together referred to as "nitrogen-containing molecular groups").

It is thought that when the nitrogen-containing organic substance has a nitrogen-containing molecular group in a molecule, this organic substance can be more strongly coordinated to a transition metal atom derived from the transition metal compound by way of mixing in the step (i).

Of the nitrogen-containing molecular groups, more preferable are amino group, imine group, amide group, pyrrole group, pyridine group and pyrazine group; still more preferable are amino group, imine group, pyrrole group and pyrazine group; and particularly preferable are amino group and pyrazine group because the activity of the resulting catalyst is particularly enhanced.

Examples of the nitrogen-containing organic substances containing no oxygen atom include melamine, ethylenediamine, ethylenediamine/dihydrochloride, triazole, acetonitrile, acrylonitrile, ethyleneimine, aniline, pyrrole and polyethyleneimine. Of these, ethylenediamine and ethylenediamine/dihydrochloride are preferable because the resulting catalyst has a high activity.

The nitrogen-containing organic substance preferably has a hydroxyl group, a carboxyl group, an aldehyde group, an acid halide group, a sulfo group, a phosphoric acid group, a ketone group, an ether group or an ester group (these groups are also together referred to as "oxygen-containing molecular groups"). It is thought that when the nitrogen-containing organic substance has an oxygen-containing molecular group in a molecule, this organic substance can be more strongly coordinated to a transition metal atom derived from the transition metal compound by way of mixing in the step (i).

Of the oxygen-containing molecular groups, carboxyl group and aldehyde group are particularly preferable because the activity of the resulting catalyst is particularly enhanced.

The nitrogen-containing organic substance preferably contains an oxygen atom in a molecule. As the nitrogen-containing organic substance containing an oxygen atom in a molecule, a compound having the nitrogen-containing molecular group and the oxygen-containing molecular group is preferable. It is thought that such a compound can be more strongly coordinated to a transition metal atom derived from the transition metal compound by way of the step (i).

As such compounds having the nitrogen-containing molecular group and the oxygen-containing molecular group, amino acids having an amino group and a carboxyl group and their derivatives are preferable.

As the amino acids, alanine, arginine, asparagine, aspartic acid, cystine, glutamine, glutamic acid, glycine, histidine, isoleucine, leucine, lysine, methionine, phenylalanine, serine, threonine, tryptophan, tyrosine, valine, norvaline, glycylglycine, triglycine and tetraglycine are preferable; since the resulting catalyst has a high activity, alanine, glycine, lysine, methionine and tyrosine are more preferable; and since the resulting catalyst exhibits an extremely high activity, alanine, glycine and lysine are particularly preferable.

In addition to the amino acids, examples of the nitrogen-containing organic substances containing an oxygen atom in a molecule include acylpyrroles, such as acetylpyrrole, pyrrolecarboxylic acid, acylimidazoles, such as acetylimidazole, carbonyldiimidazole, imidazolecarboxylic acid, pyrazole, acetonitride, pyrazinecarboxylic acid, piperidinecarboxylic acid, piperazinecarboxylic acid, morpholine, pyrimidinecarboxylic acid, nicotinic acid, 2-pyridinecarboxylic acid, 2,4-pyridinedicarboxylic acid, 8-quinolinol, and polyvinylpyrrolidone. Since the activity of the resulting catalyst is high, compounds capable of becoming bidentate ligands, specifically, pyrrole-2-carboxylic acid, imidazole-4-carboxylic acid, 2-pyrazinecarboxylic acid, 2-piperidinecarboxylic acid, 2-piperazinecarboxylic acid, nicotinic acid, 2-pyridinecarboxylic acid, 2,4-pyridinedicarboxylic acid and 8-quinolinol are preferable, and 2-pyrazinecarboxylic acid and 2-pyridinecarboxylic acid are more preferable.

<Solvent>

Examples of the solvents include water, alcohols and acids. As the alcohols, ethanol, methanol, butanol, propanol and ethoxyethanol are preferable, and ethanol and methanol are more preferable. As the acids, acetic acid, nitric acid, hydrochloric acid, phosphoric acid and citric acid are preferable, and acetic acid and nitric acid are more preferable. These may be used singly, or may be used in combination of two or more kinds.

<Suspending Agent>

When the transition metal compound is a compound containing a halogen atom, such as titanium chloride, niobium chloride, zirconium chloride or tantalum chloride, such a compound is easily hydrolyzed by water to bring about precipitation of hydroxide, acid chloride or the like. Therefore, when the transition metal compound contains a halogen atom, it is preferable to add a strong acid as a suspending agent in a high concentration of not less than 1% by mass. If the acid is, for example, hydrochloric acid, and if the acid is added so that the concentration of hydrogen chloride in the solution may become not less than 5% by mass, more preferably not less than 10% by mass, a catalyst precursor mixed liquid free from a precipitate derived from the transition metal compound can be obtained.

When water is used as the solvent singly or in combination with another compound, it is preferable to use a suspending agent. As the suspending agent in this case, a compound having a diketone structure is preferable. Specifically, diacetyl, acetylacetone, 2,5-hexanedione and dimedone are preferable, and acetylacetone and 2,5-hexanedione are more preferable.

Such a suspending agent is added in such an amount that the amount thereof preferably becomes 1 to 70% by mass, more preferably 2 to 50% by mass, still more preferably 15 to 40% by mass, in 100% by mass of the transition metal compound solution (solution containing the transition metal compound but not containing the nitrogen-containing organic substance).

Such a suspending agent is added in such an amount that the amount thereof preferably becomes 0.1 to 40% by mass, more preferably 0.5 to 20% by mass, still more preferably 2 to 10% by mass, in 100% by mass of the catalyst precursor mixed liquid.

In (i) of the step (I), it is preferable that a solution containing the transition metal compound and the suspending agent is obtained, then this solution and the nitrogen-containing organic substance are mixed, and thereafter, conductive particles are added to obtain a catalyst precursor mixed liquid. When the step (i) is carried out in this manner, occurrence of the precipitation can be more surely inhibited.

<Conductive Particles>

The conductive particles are not specifically restricted provided that they have high conduction properties and stability and have large surface area. However, there can be mentioned, for example, carbons, conductive polymers, conductive ceramics, metals, and conductive inorganic oxides such as tungsten oxide and iridium oxide, and these can be used singly or in combination. In particular, conductive particles made of carbon are preferable because they have large specific surface area, particles of small particle diameters are inexpensively and easily obtainable, and they are excellent in chemical resistance and resistance to high potential. When the conductive particles made of carbon are used, carbon alone or a mixture of carbon and other conductive particles is preferable. Examples of carbons include carbon black, graphite, activated carbon, carbon nanotube, carbon nanofiber, carbon nanohorn, fullerene, porous carbon and graphene. The particle diameter, the structure and the surface properties of the conductive particles made of carbon are not specifically restricted, but if the particles are too small, there is difficulty in formation of an electron conduction path. If the conductive particles are too large, lowering of gas diffusion properties of the catalyst layer for a fuel cell or lowering of the ratio of catalyst utilization tends to occur. Therefore, the mean particle diameter of the conductive particles, as determined by TEM observation, is preferably 1 to 1000 nm, more preferably 10 to 100 nm.

The BET value of the electron conductive particles made of carbon is preferably 50 to 3000, more preferably 100 to 3000.

Although the conductive polymers are not specifically restricted, examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferable, and polypyrrole is more preferable.

The molar ratio of the nitrogen-containing organic substance to the total sum of the transition metal compound used in the step (I) is preferably 0.1 to 10, more preferably 0.5 to 10, still more preferably 1 to 7.5.

When carbon black is used as the conductive particles, the molar ratio of the carbon black to the total sum of the transition metal compound used in the step (I) is preferably 1 to 15, more preferably 2 to 14, still more preferably 2.5 to 13. When the molar ratio of the carbon black to the total sum of the transition metal compound is in the above range, a balance between the catalytic amount to cause reaction in a fuel cell and the formation of a conduction path is good, so that such a range is preferable. Here, the molar ratio of the carbon black is a value converted based on a molecular weight of the carbon black of 12.

The method for mixing the nitrogen-containing organic substance, the transition metal compound and the conductive particles is not specifically restricted provided that these compounds can be uniformly mixed. For example, a method using an orifice contractile flow, a method using a rotary shearing flow, a method using ultrasonic waves, or the like can be mentioned.

In the step (ii), the solvent is removed from the catalyst precursor mixed liquid obtained in the step (i).

Removal of the solvent may be carried out in the atmosphere or may be carried out in an atmosphere of an inert gas (e.g., nitrogen, argon, helium). As the inert gas, nitrogen or argon is preferable, and nitrogen is more preferable, from the viewpoint of cost.

When the vapor pressure of the solvent is high, the temperature in the removal of the solvent may be ordinary temperature, but from the viewpoint of mass productivity of the catalyst, the temperature is preferably not lower than 30° C., more preferably not lower than 40° C., still more preferably not lower than 50° C. From the viewpoint that the catalyst precursor, which is contained in the solution obtained in the step (i) and is presumed to be a metal complex such as a chelate, is not decomposed, the temperature is preferably not higher than 250° C., more preferably not higher than 150° C., still more preferably not higher than 110° C.

When the vapor pressure of the solvent is high, removal of the solvent may be carried out at atmospheric pressure, but in order to remove the solvent in a shorter period of time, it may be carried out under reduced pressure (e.g., 0.1 Pa to 0.1 MPa). For the removal of the solvent under reduced pressure, an evaporator or the like can be used.

The removal of the solvent may be carried out while the mixture obtained in the step (i) is allowed to stand still, but in order to obtain more uniform solid residues, it is preferable to remove the solvent while rotating the mixture.

When the container containing the mixture has a large weight, it is preferable to rotate the solution by the use of a stirring bar, a stirring blade, a stirrer or the like.

In the case where the removal of the solvent is carried out while controlling the degree of vacuum of the container containing the mixture, drying is carried out in the container capable of being closed up, as a matter of course. Therefore, it is preferable to remove the solvent while rotating the mixture together with the container, that is, it is preferable to remove the solvent using, for example, a rotary evaporator.

The composition or the aggregated state of the solid residues obtained in the step (ii) is sometimes non-uniform depending upon the method for removing the solvent or the properties of the transition metal compound or the nitrogen-containing organic substance. In such a case, the solid residues are mixed and crushed into a more uniform and finer powder, and this powder is used in the step (II), whereby a catalyst having more uniform particle diameters can be obtained.

For mixing and crushing the solid residues, for example, a roller mill, a ball mill, a small-diameter ball mill (bead mill), a medium stirring mill, an air flow pulverizer, a mortar, an automatic kneading mortar, a tank crusher or a jet mill can be used. When the amount of the solid residues is small, a mortar, an automatic kneading mortar or a batch type ball mill is preferably used. When the amount of the solid residues is large and the mixing and crushing are continuously carried out, a jet mill is preferably used.

Step (II)

In the step (II), the mixture obtained in the step (I) is calcined.

The calcining temperature is preferably 500 to 1200° C., more preferably 600 to 1100° C., still more preferably 700 to 1050° C. If the temperature for the heat treatment is higher than the upper limit of the above range, sintering and grain growth take place among the particles of the resulting electrode catalyst, and as a result, the specific surface area of the electrode catalyst is decreased. On this account, processability in the processing of these particles into a catalyst layer by a coating method is sometimes deteriorated. On the other hand, if the temperature for the heat treatment is lower than the lower limit of the above range, it becomes difficult to obtain an electrode catalyst having a high activity.

Examples of the calcining methods include a stationary method, a stirring method, a dropping method and a powder capturing method.

The stationary method is a method in which the solid residues obtained in the step (I) are placed in a stationary type electric furnace or the like and they are heated. For the heating, the solid residues weighed out may be placed in a ceramic container such as an alumina board or a quartz board. The stationary method is preferable from the viewpoint that a large amount of the solid residues can be heated.

The stirring method is a method in which the solid residues are placed in an electric furnace such as a rotary kiln and they are heated while stirring. The stirring method is preferable from the viewpoints that a large amount of the solid residues can be heated, and besides, aggregation and growth of the particles of the resulting electrode catalyst can be inhibited. Further, from the viewpoint that an electrode catalyst can be continuously produced by giving inclination to the heating furnace, the stirring method is preferable.

The dropping method is a method in which while passing a surrounding gas in an induction furnace, the furnace is heated up to a given heating temperature, then thermal equilibrium is maintained at the temperature, thereafter the solid residues are dropped in a crucible that is a heating zone of the furnace, and they are heated.

The dropping method is preferable from the viewpoint that aggregation and growth of the particles of the resulting electrode catalyst can be reduced to the minimum.

The powder capturing method is a method in which the solid residues are made a spray that is floating in an inert gas atmosphere containing a slight amount of oxygen gas, and the spray is captured into a vertical tubular furnace maintained at a given temperature and heated.

When the calcining is carried out by the stationary method, the heating rate is not specifically restricted, but it is preferably about 1° C./min to 100° C./min, more preferably 5° C./min to 50° C./min. The heating time is preferably 0.1 to 10 hours, more preferably 0.5 hour to 5 hours, still more preferably 0.5 to 3 hours. When the heating is carried out using a tubular furnace in the stationary method, the time for heating the electrode catalyst particles is 0.1 to 10 hours, preferably 0.5 hour to 5 hours. When the heating time is in the above range, uniform electrode catalyst particles tend to be formed.

In the case of the stirring method, the time for heating the solid residues is usually 10 minutes to 5 hours, preferably 30 minutes to 2 hours. When the heating is continuously carried out by, for example, giving inclination to the furnace in this method, an average residence time calculated from a steady flow rate of the sample in the furnace is regarded as the heating time.

In the case of the dropping method, the time for heating the solid residues is usually 0.5 to 10 minutes, preferably 0.5 to 3 minutes. When the heating time is in the above range, uniform electrode catalyst particles tend to be formed.

In the case of the powder capturing method, the time for heating the solid residues is usually 0.2 second to 1 minute, preferably 0.2 to 10 seconds. When the heating time is in the above range, uniform electrode catalyst particles tend to be formed.

When the calcining is carried out by the stationary method, a heating furnace using LNG (liquefied natural gas), LPG (liquefied petroleum gas), gas oil, heavy oil, electricity or the like as a heat source may be used as a heat treatment device. In this case, it is preferable that the device is not a device in which a flame of a fuel is present inside the furnace, that is, heating is carried out inside the furnace, but a device in which heating is carried out outside the furnace, because an atmosphere in the calcining of the solid residues is important in the present invention.

When a heating furnace in which the amount of the solid residues becomes not less than 50 kg per batch is used, the heating furnace is preferably one using LNG or LPG as a heat source from the viewpoint of cost.

In the case where an electrode catalyst having a particularly high catalytic activity is intended to be obtained, it is desirable to use an electric furnace using electricity as a heat source, which is capable of strict temperature control.

As the furnaces, there can be mentioned those of various shapes, such as tubular furnace, upper lid type furnace, tunnel furnace, box furnace, sample table elevating type furnace (elevator type), car bottom furnace, etc. Of these, a tubular furnace, an upper lid type furnace, a box furnace and a sample table elevating type furnace, which are capable of strictly controlling an atmosphere, are preferable, and a tubular furnace and a box furnace are more preferable.

Also in the case of adopting the stirring method, the aforesaid heat sources can be used. However, when a method of giving inclination to the rotary kiln to continuously heat-treat the solid residues is particularly used among the stirring methods, the scale of the equipment becomes larger and the energy consumption tends to be increased, so that it is preferable to utilize a heat source derived from a fuel, such as LPG.

As an atmosphere for carrying out the calcining, an atmosphere containing an inert gas as its main component is preferable from the viewpoint that the activity of the resulting electrode catalyst is enhanced. Of such inert gases, nitrogen, argon and helium are preferable, and nitrogen and argon are more preferable, from the viewpoint that they are relatively inexpensive and easily obtainable. These inert gases may be used singly, or may be used as a mixture of two or more kinds. Although these gases are gases generally accepted as inert, there is a possibility that these inert gases, namely, nitrogen, argon, helium, etc. react with the solid residues in the heat treatment of the step (II).

When a reactive gas is present in an atmosphere for the calcining, the resulting electrode catalyst sometimes exhibits a higher catalytic ability.

For example, if the calcining is carried out in an atmosphere of nitrogen gas, argon gas, a mixed gas of nitrogen gas and argon gas, or a mixed gas of one or more gases selected from nitrogen gas and argon gas and one or more gases selected from hydrogen gas, ammonia gas and oxygen gas, an electrode catalyst having a high catalytic ability tends to be obtained.

When hydrogen gas is contained in an atmosphere for the calcining, the concentration of hydrogen gas is, for example, not more than 100% by volume, preferably 0.01 to 10% by volume, more preferably 1 to 5% by volume.

When oxygen gas is contained in an atmosphere for the calcining, the concentration of oxygen gas is, for example, 0.01 to 10% by volume, preferably 0.01 to 5% by volume.

When none of the transition metal compound, the nitrogen-containing organic substance and the solvent have an oxygen atom, the heat treatment is preferably carried out in an atmosphere containing oxygen gas.

The pressure of a gas atmosphere is not specifically restricted, and taking stability and cost of the production into consideration, calcining may be carried out at atmospheric pressure. Also under this condition, a preferred electrode catalyst for a fuel cell can be obtained.

After the heat treatment, the heat treatment product may be crushed. By carrying out crushing, processability in the production of an electrode using the resulting electrode catalyst for a fuel cell and properties of the electrode obtained can be sometimes improved. For the crushing, for example, a roller mill, a ball mill, a small-diameter ball mill (bead mill), a medium stirring mill, an air flow pulverizer, a mortar, an automatic kneading mortar, a tank crusher or a jet mill can be used. When the amount of the electrode catalyst for a fuel cell is small, a mortar, an automatic kneading mortar or a batch type ball mill is preferable. When a large amount of the calcined product is continuously treated, a jet mill or a continuous type ball mill is preferable, and of such continuous type ball mills, a bead mill is more preferable.

<Electrode Catalyst for Fuel Cell>

The electrode catalyst for a fuel cell of the present invention is characterized by being produced by the above-mentioned production process for an electrode catalyst for a fuel cell of the present invention.

The electrode catalyst for a fuel cell obtained by the above production process is, for example, a fuel cell electrode catalyst of at least one transition metal selected from the group consisting of titanium, vanadium, chromium, manganese, iron, cobalt, copper, zirconium, niobium, tantalum and tungsten.

The shape of the electrode catalyst for a fuel cell produced by the production process of the present invention is not specifically restricted as far as the electrode catalyst has preferred component ratios of carbon, nitrogen and oxygen and exhibits an activity as a fuel cell catalyst. For example, there can be mentioned shapes of a particle, a fiber, a sheet and a porous structure.

As previously described, the particle diameters of the electrode catalyst for a fuel cell produced by the production process of the present invention are much smaller than the particle diameters of an electrode catalyst for a fuel cell produced by a conventional production process. On this account, the electrode catalyst for a fuel cell produced by the production process for an electrode catalyst for a fuel cell of the present invention has a higher catalytic activity.

The particles diameters of the electrode catalyst for a fuel cell can be determined by, for example, a transmission electron microscope (TEM). As the method to measure the particle diameters by a transition electron microscope, the following method can be mentioned.

A product obtained by the production process for an electrode catalyst for a fuel cell of the present invention is dispersed in ethanol, and a copper microgrid is immersed in the dispersion and air-dried to prepare a sample. A HITACHI transmission electron microscope H-9500 (acceleration voltage: 300 kV) is used, and the magnification is set to 50.0K±10%. Measurement is carried out in 10 fields of view, and image analysis is carried out for each of them. In this case, the particles of the electrode catalyst for a fuel cell can be confirmed by a contrast of the image and an energy dispersion type X-ray analytical device (EDX). The image analysis can be carried out by the use of particle diameter image analysis software LUZEX AP. Not less than 90% of the particles in terms of the number of particles preferably have a particle diameter of not more than 100 nm, more preferably not more than 75 nm, further more preferably not more than 50 nm, as a mean value of the 10 fields of view. An electrode catalyst for a fuel cell satisfying this condition has high dispersibility and has a high catalytic activity.

In the case where an electrode catalyst for a fuel cell produced by a conventional production process is used as a fuel cell catalyst, it is also possible to crush the electrode catalyst for a fuel cell by a ball mill, an air flow pulverizer, a mortar or the like to make the particle diameters smaller, but the crushing ability thereof is limited, and the particle diameters cannot be made so small as those of the electrode catalyst for a fuel cell of the present invention. On this account, even if the electrode catalyst for a fuel cell produced by a conventional production process for an electrode catalyst for a fuel cell is crushed, an electrode catalyst for a fuel cell having a catalytic activity of as high as the electrode catalyst for a fuel cell of the present invention cannot be obtained.

In the case of an electrode catalyst for a fuel cell produced by a conventional production process for an electrode catalyst for a fuel cell, a carrier such as carbon black is usually mixed with the electrode catalyst for a fuel cell in order to secure high conduction properties, stability and large surface area. In the production process for an electrode catalyst for a fuel cell of the present invention, conductive particles that become carriers, such as carbon black, are used, and therefore, the electrode catalyst for a fuel cell is produced in such a state that the catalyst is supported on the conductive particles that are carriers, such as carbon black. On this account, it is unnecessary to newly mix a carrier with the electrode catalyst for a fuel cell in the production process for an electrode catalyst for a fuel cell of the present invention.

If the electrode catalyst for a fuel cell produced by the conventional production process for an electrode catalyst for a fuel cell is mixed with carbon black, plural carbon black particles adhere to the particle surface of the electrode catalyst for a fuel cell, because the particles of the electrode catalyst for a fuel cell are larger as compared with the carbon black particles. On the other hand, as for the electrode catalyst for a fuel cell produced by the production process for an electrode catalyst for a fuel cell of the present invention and carbon black, the particles of the electrode catalyst for a fuel cell are smaller as compared with the carbon black particles, and therefore, plural electrode catalyst particles for a fuel cell adhere to the particle surface of the carbon black.

In the measurement of the electrode catalyst for a fuel cell by a powder X-ray diffraction method (Cu-Kα rays), at least one X-ray diffraction peak corresponding to the structure of an oxide, a carbide, a nitride, a nitrogen oxide, a carbon oxide or a carbonitrooxide of a transition metal contained in the electrode catalyst for a fuel cell is observed.

The X-ray diffraction peak means a peak that is obtained at a specific diffraction angle and a specific diffraction intensity when the sample (crystalline) is irradiated with X rays at various angles.

In the present invention, a signal detectable in a ratio (S/N) of signal (S) to noise (N) of 2 or more is regarded as one diffraction peak.

Here, the noise (N) is taken as a width of a baseline.

The X-ray diffraction method can be carried out using, for example, an x-ray powder analytical device RIGAKU RAD-RX as a measuring device, and can be carried out under the following measuring conditions: X-ray output (Cu-Kα): 50 kV, 180 mA, scanning axis: θ/2θ, measuring range (2θ): 10° to 89.98°, measuring mode: FT, reading width: 0.02°, sampling time: 0.70 second, DS, SS, RS: 0.5°, 0.5°, 0.15 mm, and goniometer radius: 185 mm.

As previously described, an electrode catalyst for a fuel cell is usually mixed with conductive particles such as carbon black in order to give conduction properties, but the electrode catalyst for a fuel cell produced by the production process for an electrode catalyst for a fuel cell of the present invention is obtained in such a state that the catalyst is supported on carbon black, and therefore, it is unnecessary to newly mix conductive particles.

The oxygen reduction onset potential of the electrode catalyst for a fuel cell, as measured in accordance with the following measuring method (A), is not less than 0.5 V (vs. RHE) based on the reversible hydrogen electrode.

[Measuring Method (A)]:

The catalyst and NAFION (registered trademark) (DuPont 5% NAFION (registered trademark) solution (DE521)) are introduced in a solvent, and they are ultrasonically stirred to obtain a suspension. As the solvent, a mixture of isopropyl alcohol:water (=1:1, ratio by mass) is used.

While ultrasonicating, 10 µl of the above suspension is withdrawn, and it is rapidly dropped on a glassy carbon electrode (diameter: 5.2 mm) and dried at 60° C. for 5 minutes. Through the drying, a fuel cell catalyst layer containing a catalyst is formed on the glassy carbon electrode. These dropping and drying operations are carried out until a fuel cell catalyst layer of 1.0 mg is formed on the carbon electrode surface.

The electrode obtained as above is polarized in a sulfuric acid aqueous solution of 0.5 mol/l at a temperature of 30° C. and a potential scanning rate of 5 mV/sec in an oxygen atmosphere and a nitrogen atmosphere to measure a current-potential curve, while a reversible hydrogen electrode in a sulfuric acid aqueous solution of the same concentration is taken as a reference electrode. In this measurement, a potential at which a difference of not less than 0.5 µA/cm$^2$ between the reduction current in an oxygen atmosphere and the reduction current in a nitrogen atmosphere begins to appear is taken as an oxygen reduction onset potential.]

In the present invention, the oxygen reduction current density can be determined in the following manner.

First, from the results of the measuring method (A), a difference between the reduction current in an oxygen atmosphere and the reduction current in a nitrogen atmosphere at 0.8 V (vs. RHE) is calculated. The calculated value is divided by the electrode area, and the resulting value is taken as an oxygen reduction current density (mA/cm$^2$)

<Uses>

The electrode catalyst for a fuel cell of the present invention can be used as a substitute catalyst for a platinum catalyst.

The catalyst layer for a fuel cell of the present invention is characterized by containing the above-mentioned electrode catalyst for a fuel cell.

As catalyst layers for a fuel cell, there are an anode catalyst layer and a cathode catalyst layer, and the above electrode catalyst for a fuel cell can be used for any of them. Since the electrode catalyst for a fuel cell has excellent durability and has a high oxygen reduction ability, it is preferably used for the cathode catalyst layer.

As previously described, the electrode catalyst for a fuel cell produced by the production process for an electrode catalyst for a fuel cell of the present invention is obtained in such a state that the catalyst is supported on carbon black, and therefore, it is unnecessary to newly add conductive particles, but the conductive particles may be newly added.

The polymer electrolyte is not specifically restricted provided that it is a polymer electrolyte generally used in a catalyst layer for a fuel cell. Specifically, there can be mentioned a perfluorocarbon polymer having a sulfonic acid group (e.g., NAFION (registered trademark) (DuPont 5% NAFION (registered trademark) solution (DE521), etc.), a hydrocarbon-based polymer compound having a sulfonic acid group, a polymer compound doped with an inorganic acid such as phosphoric acid, an organic/inorganic hybrid polymer apart of which has been substituted by a proton conductive functional group, a proton conductor in which a polymer matrix has been impregnated with a phosphoric acid aqueous solution or a sulfuric acid aqueous solution, etc. Of these, NAFION (registered trademark) (DuPont 5% NAFION (registered trademark) solution (DE521)) is preferable.

The catalyst layer for a fuel cell of the present invention can be used as any of the anode catalyst layer and the cathode catalyst layer. The catalyst layer for a fuel cell of the present invention has a high oxygen reduction ability and contains a catalyst that is hardly corroded in an acidic electrolyte even at a high potential, and therefore, the catalyst layer is useful as a catalyst layer (cathode catalyst layer) provided in a cathode of a fuel cell. In particular, the catalyst layer of the present invention is preferably used as a catalyst layer provided in a cathode of a membrane electrode assembly of a solid polymer type fuel cell.

In order to disperse the electrode catalyst for a fuel cell in a solvent, a method of dispersing by air flow, a method of dispersing in liquid, or the like can be mentioned. The method of dispersing in liquid is preferable because a dispersion of the catalyst in a solvent can be used in a step of forming a catalyst layer for a fuel cell. As the method of dispersing in liquid, a method using an orifice contractile flow, a method using a rotary shearing flow, a method using ultrasonic waves, or the like can be mentioned. The solvent used in the method of dispersing in liquid is not specifically restricted provided that it does not erode the catalyst and the electron conductive particles and can disperse them. In general, a volatile liquid organic solvent, water or the like is used.

When the electrode catalyst for a fuel cell is dispersed in a solvent, the electrolyte and a dispersing agent may be further dispersed at the same time.

Although the method for forming the catalyst layer for a fuel cell is not specifically restricted, there can be mentioned, for example, a method of applying a suspension containing the electrode catalyst for a fuel cell and the electrolyte onto the later-described electrolyte membrane or gas diffusion layer. Examples of the application methods include bar coating, dipping, screen printing, roll coating and spraying. Also available is a method in which a catalyst layer for a fuel cell is formed from a suspension containing the electrode catalyst for a fuel cell and the electrolyte on a base material by a coating method or a filtration method, and then the catalyst layer for a fuel cell is transferred onto an electrolyte membrane by a transfer method.

The electrode of the present invention is characterized by having the catalyst layer for a fuel cell and a porous supporting layer (gas diffusion layer).

The electrode of the present invention can be used as any electrode of a cathode and an anode. The electrode of the present invention is excellent in durability and has a high catalytic ability, and therefore, when it is used as the cathode, the industrial predominance becomes higher.

The gas diffusion layer (porous supporting layer) is a layer that diffuses a gas. The gas diffusion layer is not specifically restricted provided that it has electron conduction properties, exhibits high gas diffusion properties and has high corrosion resistance. In general, a carbon-based porous material, such as carbon paper or carbon cloth, stainless steel for weight lightening, or an aluminum foil coated with an anti-corrosive material is used.

The membrane electrode assembly of the present invention is a membrane electrode assembly having a cathode, an anode and an electrolyte membrane arranged between the cathode and the anode, and is characterized in that the cathode and/or the anode is the aforesaid electrode.

As the electrolyte membrane, for example, an electrolyte membrane using a perfluorosulfonic acid-based substance or a hydrocarbon-based electrolyte membrane is generally used. However, a membrane in which a polymer microporous membrane has been impregnated with a liquid electrolyte, a membrane in which a porous body has been filled with a polymer electrolyte, or the like may be used.

The fuel cell of the present invention is characterized by having the above membrane electrode assembly.

The electrode reaction of a fuel cell takes place at a so-called three-phase interface (electrolyte-electrode catalyst-reaction gas). Fuel cells are classified into several groups according to a difference in an electrolyte used, etc., and there are a molten carbonate type (MCFC), a phosphoric acid type (PAFC), a solid oxide type (SOFC), a solid polymer type (PEFC), etc. The membrane electrode assembly of the present invention is preferably used for a solid polymer type fuel cell among them.

The fuel cell using the electrode catalyst for a fuel cell of the present invention has features that it exhibits high performance and is extremely inexpensive as compared with a case of using platinum as a catalyst. The fuel cell of the present invention has at least one function selected from the group consisting of power generation function, light emission function, heat generation function, sound generation function, kinetic function, display function and charging function, and can enhance performance of an article having the fuel cell, particularly performance of a portable article. The fuel cell is preferably provided on a surface of an article or inside thereof.

<Examples of Articles Having Fuel Cell of the Present Invention>

Examples of the articles in which the fuel cell of the present invention can be provided include structures, such as buildings, houses and tents, lighting fixtures, such as fluorescent light, LED, organic EL, street lamps, interior illuminators and signals, machines, automotive equipments including vehicles themselves, household appliances, agricultural equipments, electronic equipments, portable information terminals including cellular phones, equipments for beauty, transportable tools, sanitary equipments, such as bath goods and toilet goods, furniture, toys, decorations, bulletin boards, cooler boxes, outdoor goods, such as outdoor power generators, teaching materials, artificial flowers, objects, power sources for heart pacemakers, and power sources for heating and cooling equipments equipped with Peltier device.

EXAMPLES

The present invention is described in more detail with reference to the following examples, but it should be construed that the present invention is in no way limited to those examples.

Various measurements in the examples and the comparative examples were carried out by the following methods.

[Analytical Method]

1. Powder X-Ray Diffraction

Powder X-ray diffraction of a sample was carried out by the use of Rotaflex manufactured by Rigaku Denki Co., Ltd.

The number of diffraction peaks in the powder X-ray diffraction of each sample was counted by regarding a signal, which was detectable in a ratio (S/N) of signal (S) to noise (N) of 2 or more, as one peak.

The noise (N) was taken as a width of a baseline.

2. Particle Diameter Measurement by TEM

The product obtained was dispersed in ethanol, and a copper microgrid was immersed in the dispersion and air-dried to prepare a sample. A HITACHI transmission electron microscope H-9500 (acceleration voltage: 300 kV) was used, and the magnification was set to 50.0K±10%. Measurement was carried out in 10 fields of view, and image analysis was carried out for each of them. The image analysis was carried out by the use of particle diameter image analysis software LUZEX AP.

Example 1

Preparation of Catalyst

To a solution of 3.59 ml of acetylacetone (manufactured by Junsei Chemical Co., Ltd.) and 5.47 ml of acetic acid (manufactured by Wako Pure Chemical Industries, Ltd.) was added 3.42 ml of titanium tetraisopropoxide (manufactured by Junsei Chemical Co., Ltd.), and the mixture was stirred at room temperature to prepare a titanium-containing solution. Further, to a mixed solution of 75 ml of pure water and 50 ml of ethanol (manufactured by Wako Pure Chemical Industries, Ltd.), 3.43 g of glycine (manufactured by Wako Pure Chemical Industries, Ltd.) and 0.199 g of iron acetate (manufactured by Aldrich) were added, and they were stirred at room temperature to completely dissolve them, whereby a glycine-containing mixture solution was prepared. The titanium-containing mixture solution was slowly added to the glycine-containing mixture solution to prepare a mixed solution. To this mixed solution, 0.71 g of carbon black (Ketjen Black EC300J, manufactured by Lion Corporation) was added, and they were stirred for one hour at room temperature. This carbon-containing mixed solution was evaporated to dryness by the use of an evaporator, and the resulting solids were finely and uniformly crushed in a mortar to obtain a powder.

This powder was heated by a rotary kiln at 900° C. for one hour while passing a mixed gas of nitrogen gas and hydrogen gas in which a mixing ratio of hydrogen gas was 4% by volume, whereby a catalyst containing at least titanium, carbon, nitrogen and oxygen (also referred to as a "catalyst (1)" hereinafter) was obtained.

In this operation, the molar ratio of the nitrogen-containing organic substance to the transition metal compounds was 3.5, and the molar ratio of carbon black to the transition metal compounds was 4.5.

A powder X-ray diffraction spectrum of the catalyst (1) is shown in FIG. 1. Diffraction peaks of titanium carbonitrooxide having a cubic crystal structure and titanium oxide having a rutile structure were observed.

Through the particle diameter measurement by TEM, it was confirmed that not less than 90% of the particles in terms of the number of particles had a particle diameter of 50 nm as a mean value of 10 fields of view.

Figure 2:
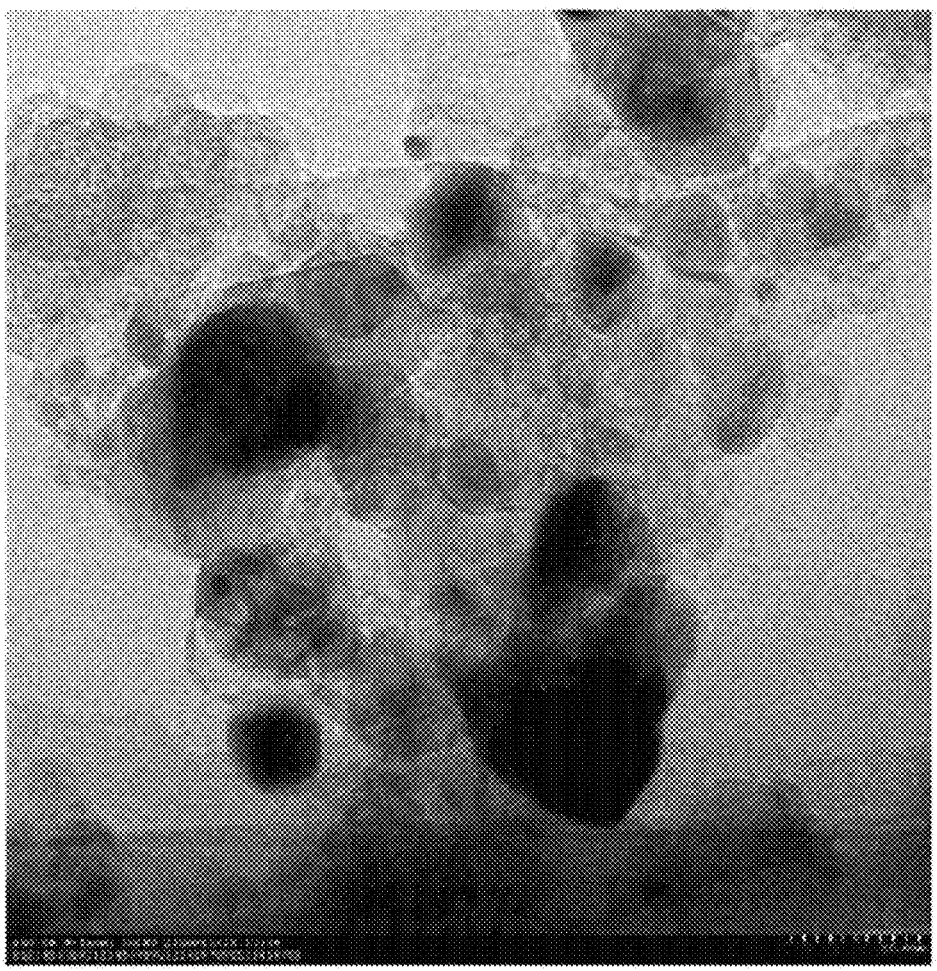
FIG. 2 is a TEM photograph of a catalyst (1).

In FIG. 2, a TEM photograph of the catalyst (1) is shown. In FIG. 2, black areas indicate the catalyst, and gray areas indicate carbon black.

Example 2

Preparation of Catalyst

A powder of a catalyst (also referred to as a "catalyst (2)" hereinafter) was obtained in the same manner as in Example 1, except that the amount of carbon black added was changed to 1.065 g.

In this operation, the molar ratio of the nitrogen-containing organic substance to the transition metal compounds was 3.5, and the molar ratio of carbon black to the transition metal compounds was 6.8.

Figure 3:
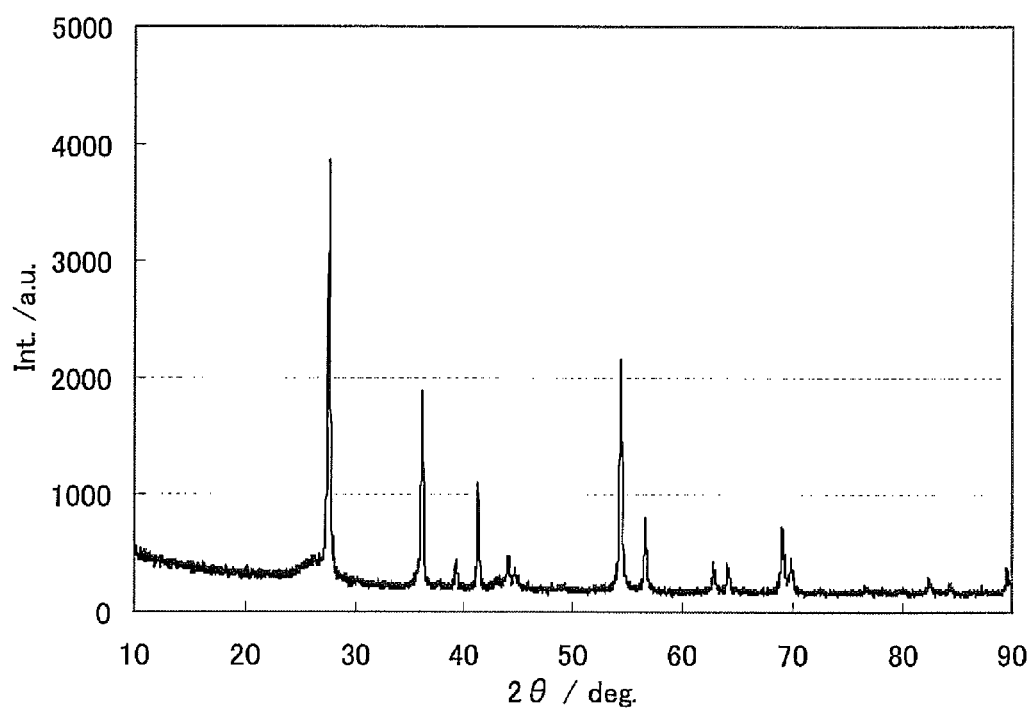
FIG. 3 is a powder X-ray diffraction spectrum of a catalyst (2).

A powder X-ray diffraction spectrum of the catalyst (2) is shown in FIG. 3. Diffraction peaks of titanium carbonitrooxide having a cubic crystal structure and titanium oxide having a rutile structure were observed.

Figure 4:
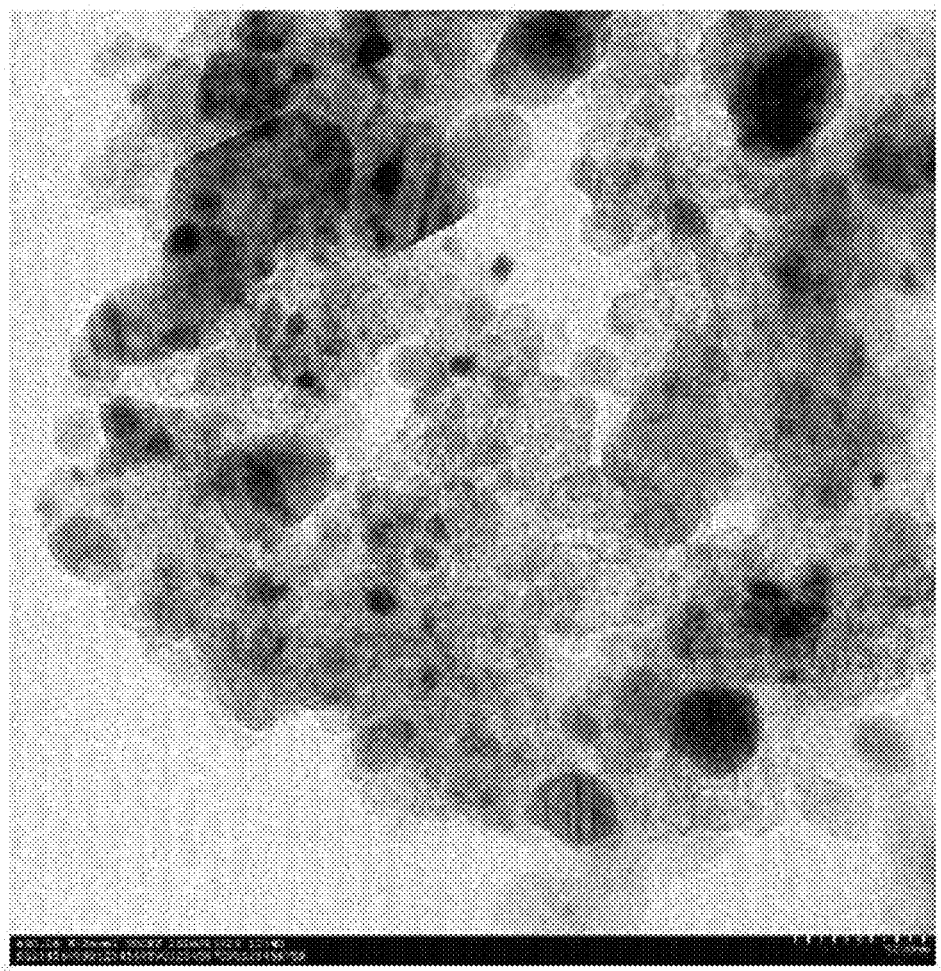
FIG. 4 is a TEM photograph of a catalyst (2).

Through the particle diameter measurement by TEM, it was confirmed that not less than 90% of the particles in terms of the number of particles had a particle diameter of 40 nm as a mean value of 10 fields of view. In FIG. 4, a TEM photograph of the catalyst (2) is shown.

Example 3

Preparation of Catalyst

A powder of a catalyst (also referred to as a "catalyst (3)" hereinafter) was obtained in the same manner as in Example 1, except that the amount of carbon black added was changed to 1.42 g.

In this operation, the molar ratio of the nitrogen-containing organic substance to the transition metal compounds was 3.5, and the molar ratio of carbon black to the transition metal compounds was 8.9.

Figure 5:
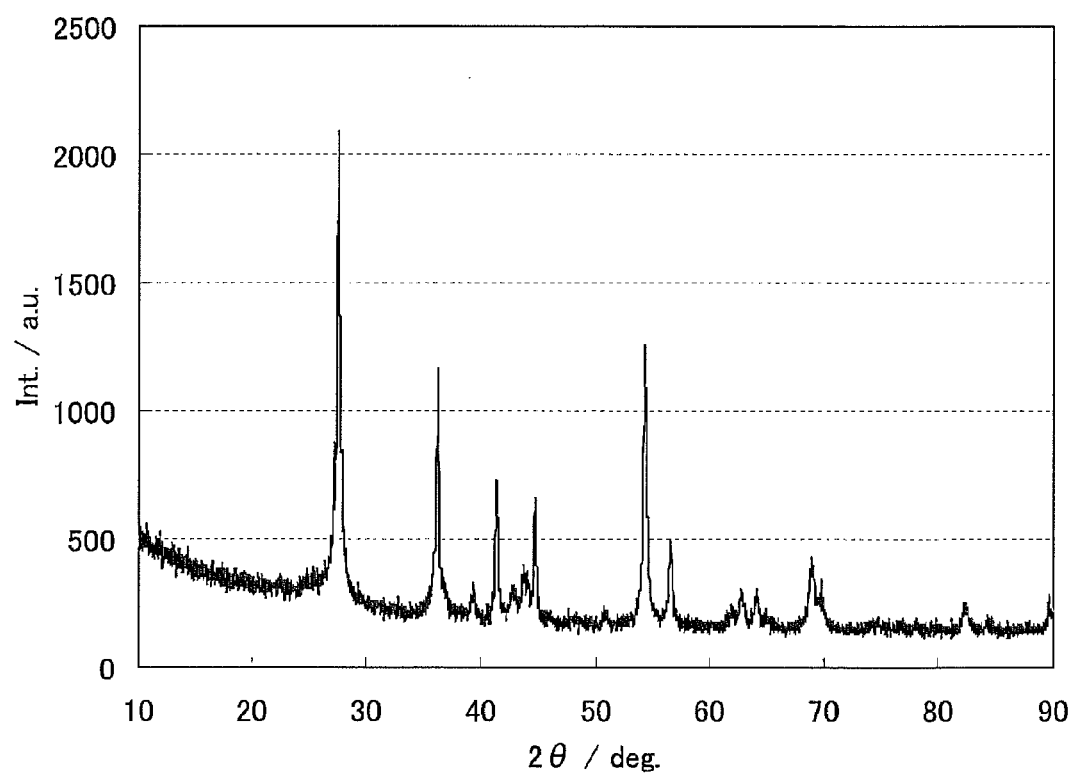
FIG. 5 is a powder X-ray diffraction spectrum of a catalyst (3).

A powder X-ray diffraction spectrum of the catalyst (3) is shown in FIG. 5. Diffraction peaks of titanium carbonitrooxideide having a cubic crystal structure and titanium oxide having a rutile structure were observed.

Through the particle diameter measurement by TEM, it was confirmed that not less than 90% of the particles in terms of the number of particles had a particle diameter of not more than 30 nm as a mean value of 10 fields of view.

Figure 6:
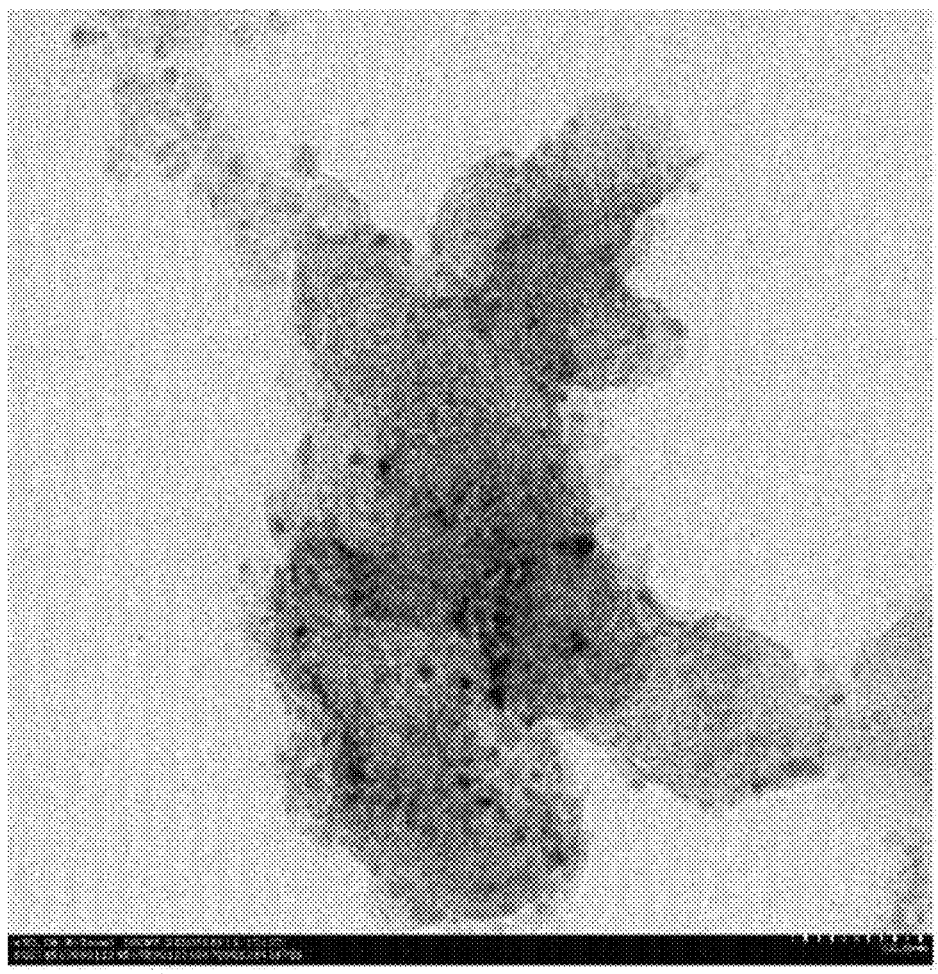
FIG. 6 is a TEM photograph of a catalyst (3).

In FIG. 6, a TEM photograph of the catalyst (3) is shown.

Example 4

Preparation of Catalyst

To a solution of 3.59 ml of acetylacetone (manufactured by Junsei Chemical Co., Ltd.) and 5.47 ml of acetic acid (manufactured by Wako Pure Chemical Industries, Ltd.) was added 3.42 ml of titanium tetraisopropoxide (manufactured by Junsei Chemical Co., Ltd.), and the mixture was stirred at room temperature to prepare a titanium-containing mixture solution. Further, to a mixed solution of 75 ml of pure water and 50 ml of ethanol (manufactured by Wako Pure Chemical Industries, Ltd.), 3.04 g of ethylene diammonium dichloride (manufactured by Wako Pure Chemical Industries, Ltd.) and 0.262 g of chromium acetate (manufactured by Aldrich) were added, and they were stirred at room temperature to completely dissolve them, whereby an ethylene diammonium dichloride-containing mixture solution was prepared. The titanium-containing mixture solution was slowly added to the ethylene diammonium dichloride-containing mixture solution to prepare a mixed solution. To this mixed solution, 1.065 g of carbon black (Ketjen Black EC300J, manufactured by Lion Corporation) was added, and they were stirred for one hour at room temperature. This carbon-containing mixed solution was evaporated to dryness by the use of an evaporator, and the resulting solids were finely and uniformly crushed in a mortar to obtain a powder. This powder was heated by a rotary kiln at 900° C. for one hour while passing a mixed gas of nitrogen gas and hydrogen gas in which a mixing ratio of hydrogen gas was 4% by volume, whereby a catalyst containing at least titanium, carbon, nitrogen and oxygen (also referred to as a "catalyst (4)" hereinafter) was obtained.

In this operation, the molar ratio of the nitrogen-containing organic substance to the transition metal compounds was 1.8, and the molar ratio of carbon black to the transition metal compounds was 6.8.

Figure 7:
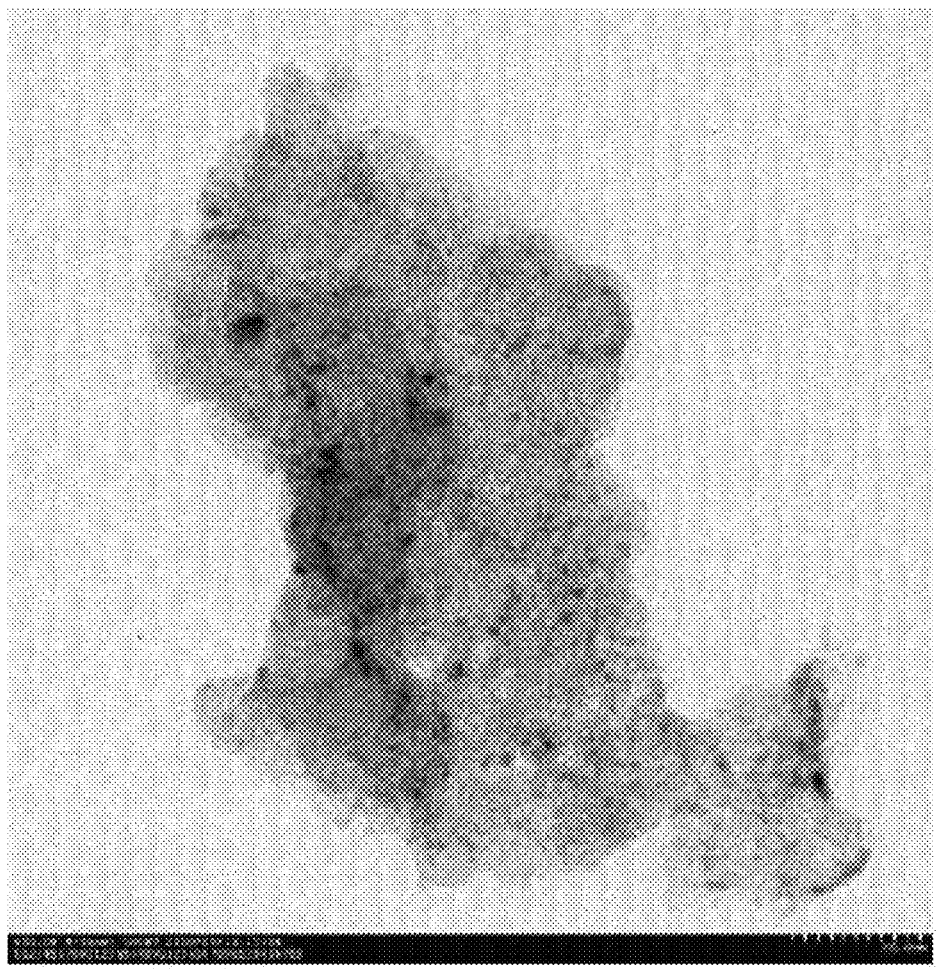
FIG. 7 is a TEM photograph of a catalyst (4).

Through the particle diameter measurement by TEM, it was confirmed that not less than 90% of the particles in terms of the number of particles had a particle diameter of not more than 30 nm as a mean value of 10 fields of view. In FIG. 7, a TEM photograph of the catalyst (4) is shown.

Example 5

Preparation of Catalyst

A powder of a catalyst (also referred to as a "catalyst (5)" hereinafter) was obtained in the same manner as in Example 2, except that 0.199 g of iron acetate (manufactured by Aldrich) was not added.

In this operation, the molar ratio of the nitrogen-containing organic substance to the transition metal compound was 4, and the molar ratio of carbon black to the transition metal compound was 7.4.

Example 6

Preparation of Catalyst

A powder of a catalyst (also referred to as a "catalyst (6)" hereinafter) was obtained in the same manner as in Example 5, except that 2.87 ml of niobium ethoxide (manufactured by Aldrich) was added instead of 3.42 ml of titanium tetraisopropoxide (manufactured by Junsei Chemical Co., Ltd.).

In this operation, the molar ratio of the nitrogen-containing organic substance to the transition metal compounds was 4, and the molar ratio of carbon black to the transition metal compounds was 7.4.

Comparative Example 1

Preparation of Catalyst

A powder of a catalyst (also referred to as a "catalyst (7)" hereinafter) was obtained in the same manner as in Example 1, except that carbon black was not added.

Figure 8:
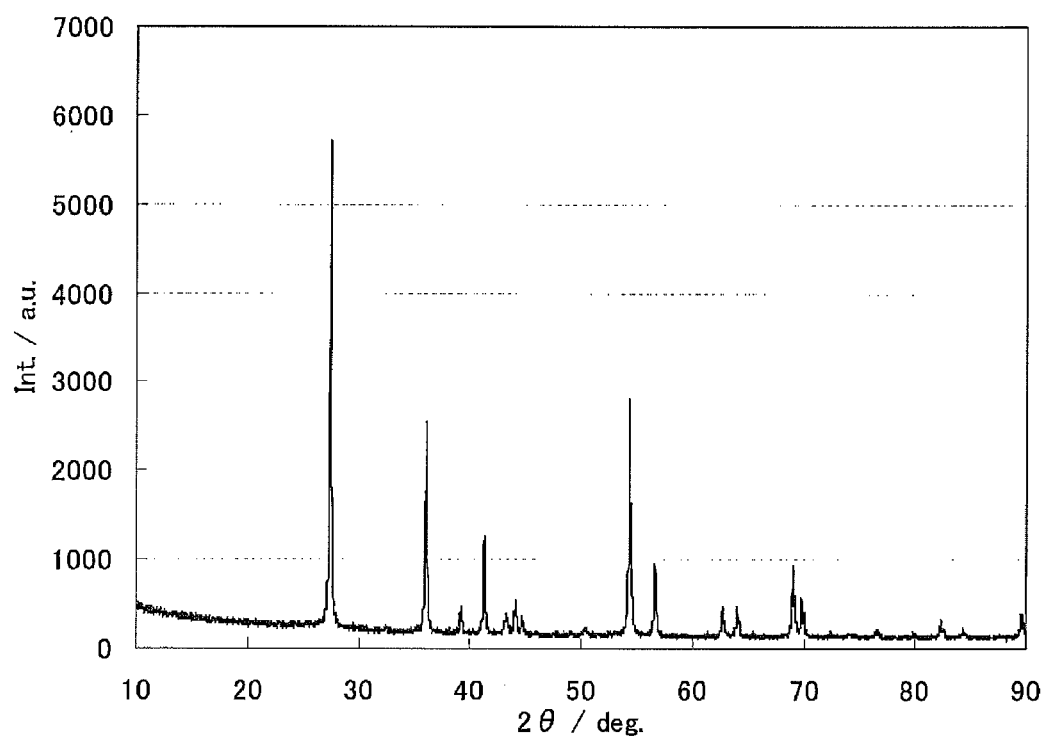
FIG. 8 is a powder X-ray diffraction spectrum of a catalyst (7).

A powder X-ray diffraction spectrum of the catalyst (7) is shown in FIG. 8. Diffraction peaks of titanium carbonitrooxide having a cubic crystal structure and titanium oxide having a rutile structure were observed.

Through the particle diameter measurement by TEM, it was confirmed that not less than 90% of the particles in terms of the number of particles had a particle diameter of not less than 100 nm as a mean value of 10 fields of view.

Figure 9:
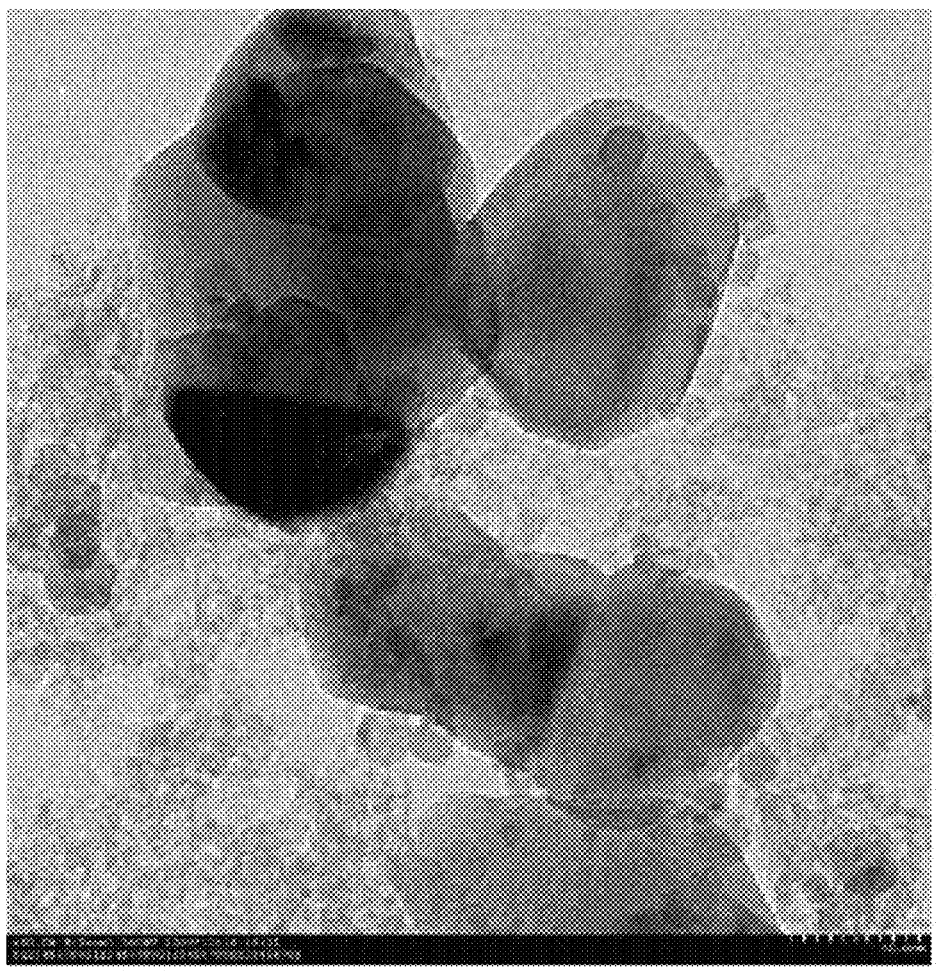
FIG. 9 is a TEM photograph of a catalyst (7).

In FIG. 9, a TEM photograph of the catalyst (7) is shown.

In FIG. 9 based on the conventional process, catalyst particles of not less than 100 nm can be confirmed, and around them, carbon black is present. On the other hand, it can be seen that the catalyst particles in FIG. 2 based on the production process of the present invention are smaller than those in FIG. 9 and the catalyst particles have been dispersed and supported on the carbon black.

Comparative Example 2

Preparation of Catalyst

A powder of a catalyst (also referred to as a "catalyst (8)" hereinafter) was obtained in the same manner as in Example 4, except that carbon black was not added.

Through the particle diameter measurement by TEM, it was confirmed that not less than 90% of the particles in terms of the number of particles had a particle diameter of not less than 100 nm as a mean value of 10 fields of view.

Comparative Example 3

Preparation of Catalyst

A powder of a catalyst (also referred to as a "catalyst (9)" hereinafter) was obtained in the same manner as in Example 5, except that carbon black was not added.

Comparative Example 4

Preparation of Catalyst

A powder of a catalyst (also referred to as a "catalyst (10)" hereinafter) was obtained in the same manner as in Example 6, except that carbon black was not added.

Example 7

Evaluation of Catalyst in Single Electrode

1. Preparation of Electrode for Fuel Cell

To 0.015 g of the catalyst (1), 1212 µl of a mixed solution of isopropyl alcohol:pure water (1:1 by volume) and 37.5 µl of NAFION (registered trademark) (DuPont 5% NAFION (registered trademark) solution (DE521)) were added, and they were ultrasonically dispersed to prepare a suspension. While ultrasonicating, 10 μl of the suspension was withdrawn, and it was rapidly dropped on a glassy carbon electrode (diameter: 5.2 mm) and dried at 60° C. for 5 minutes. These dropping and drying operations were carried out until a fuel cell catalyst layer of 1.0 mg was formed on the carbon electrode surface, whereby an electrode (1) for a fuel cell was obtained.

2. Evaluation of Oxygen Reduction Ability

The electrode (1) for a fuel cell prepared above was polarized in a sulfuric acid solution of 0.5 mol/dm$^3$ at 30° C. and a potential scanning rate of 5 mV/sec in an oxygen atmosphere and a nitrogen atmosphere to measure a current-potential curve. In this measurement, a reversible hydrogen electrode in a sulfuric acid solution of the same concentration was taken as a reference electrode.

From the above measurement results, a difference between the reduction current in an oxygen atmosphere and the reduction current in a nitrogen atmosphere at 0.8 V (vs. RHE) was calculated. The calculated value was divided by the electrode area, and the resulting value was taken as an oxygen reduction current density (mA/cm$^2$) @0.8V.

From the oxygen reduction current density, the catalytic ability of the prepared electrode (1) for a fuel cell was evaluated. That is to say, a higher oxygen reduction current density indicates a higher catalytic ability of the catalyst in the electrode for a fuel cell.

The catalyst (1) prepared in Example 1 had an oxygen reduction current density of 0.65 mA/cm$^2$ and proved to have a high catalytic ability.

Example 8

Evaluation of Catalyst in Single Electrode

1. Preparation of Electrode for Fuel Cell

An electrode (2) for a fuel cell was obtained in the same manner as in Example 7, except that the catalyst (2) was used instead of the catalyst (1).

2. Evaluation of Oxygen Reduction Ability

An oxygen reduction current density (mA/cm$^2$) @0.8V was measured in the same manner as in Example 7, except that the electrode (2) for a fuel cell was used instead of the electrode (1) for a fuel cell.

The catalyst (2) prepared in Example 2 had an oxygen reduction current density of 0.73 mA/cm$^2$ and proved to have a high catalytic ability.

Example 9

Evaluation of Catalyst in Single Electrode

1. Preparation of Electrode for Fuel Cell

An electrode (3) for a fuel cell was obtained in the same manner as in Example 7, except that the catalyst (3) was used instead of the catalyst (1).

2. Evaluation of Oxygen Reduction Ability

An oxygen reduction current density (mA/cm$^2$) @0.8V was measured in the same manner as in Example 7, except that the electrode (3) for a fuel cell was used instead of the electrode (1) for a fuel cell.

The catalyst (3) prepared in Example 3 had an oxygen reduction current density of 0.59 mA/cm$^2$ and proved to have a high catalytic ability.

Example 10

Evaluation of Catalyst in Single Electrode

1. Preparation of Electrode for Fuel Cell

An electrode (4) for a fuel cell was obtained in the same manner as in Example 7, except that the catalyst (4) was used instead of the catalyst (1).

2. Evaluation of Oxygen Reduction Ability

An oxygen reduction current density (mA/cm$^2$) @0.8V was measured in the same manner as in Example 7, except that the electrode (4) for a fuel cell was used instead of the electrode (1) for a fuel cell.

The catalyst (4) prepared in Example 4 had an oxygen reduction current density of 0.4 mA/cm$^2$ and proved to have a high catalytic ability.

Comparative Example 5

Evaluation of Catalyst in Single Electrode

1. Preparation of Electrode for Fuel Cell

To a mixture of 0.012 g of the catalyst (7) and 0.003 g of carbon black (Ketjen Black EC300J, manufactured by Lion Corporation), 1212 μl of a mixed solution of isopropyl alcohol:pure water (1:1 by volume) and 37.5 μl of NAFION (registered trademark) (DuPont 5% NAFION (registered trademark) solution (DE521)) were added, and they were ultrasonically dispersed to prepare a suspension. While ultrasonicating, 10 μl of the suspension was withdrawn, and it was rapidly dropped on a glassy carbon electrode (diameter: 5.2 mm) and dried at 60° C. for 5 minutes. These dropping and drying operations were carried out until a fuel cell catalyst layer of 1.0 mg was formed on the carbon electrode surface, whereby an electrode (5) for a fuel cell was obtained.

2. Evaluation of Oxygen Reduction Ability

An oxygen reduction current density (mA/cm$^2$) @0.8V was measured in the same manner as in Example 7, except that the electrode (5) for a fuel cell was used instead of the electrode (1) for a fuel cell.

The catalyst (7) prepared in Comparative Example 1 had an oxygen reduction current density of 0.54 mA/cm$^2$.

Comparative Example 6

Evaluation of Catalyst in Single Electrode

1. Preparation of Electrode for Fuel Cell

An electrode (6) for a fuel cell was obtained in the same manner as in Comparative Example 5, except that the catalyst (8) was used instead of the catalyst (7).

2. Evaluation of Oxygen Reduction Ability

An oxygen reduction current density (mA/cm$^2$) @0.8V was measured in the same manner as in Example 7, except that the electrode (6) for a fuel cell was used instead of the electrode (1) for a fuel cell.

The catalyst (8) prepared in Comparative Example 2 had an oxygen reduction current density of 0.18 mA/cm$^2$.

Example 11

Evaluation of Catalyst in MEA

1. Preparation of Ink

The catalyst (5) was crushed in the following manner by the use of a planetary ball mill (Fritsch Premium 7, rotation radius: 2.3 cm, revolution radius: 16.3 cm).

Inside a closable zirconia mill container (volume: 45 ml, inner diameter: 45 mm), 0.5 g of the catalyst (5), 40 g of zirconia balls having a diameter of 0.5 mm (manufactured by Nikkato Corporation) and 10 ml of 2-propabol (manufactured by Wako Pure Chemical Industries, Ltd.) were placed. The zirconia mill container was closed up, and the interior of the container was sufficiently purged with argon.

Next, the catalyst (5) was crushed under the conditions of a rotational speed of 700 rpm, a revolving speed of 350 rpm, a rotational centrifugal acceleration of 12.6 G, a revolving centrifugal acceleration of 22.3 G and a crushing time of 10 minutes. The catalyst obtained after the crushing was taken as a catalyst (11) for a fuel cell.

After the crushing, the catalyst was subjected to water cooling together with the zirconia mill container. After the water cooling, 2-propanol and the catalyst (11) for a fuel cell were separated from the zirconia balls. Then, 2-propanol was further removed by means of suction filtration, and the catalyst (11) for a fuel cell was taken out.

Next, 0.39 g of the catalyst (11) for a fuel cell was added to a mixed solution of 25 ml of 2-propanol (manufactured by Wako Pure Chemical Industries, Ltd.) and 25 ml of distilled water, then 4.67 g of an aqueous solution (Nafion 5% aqueous solution, manufactured by Wako Pure Chemical Industries, Ltd.) containing a proton conductive material (NAFION (registered trademark)) was further added, and they were mixed by an ultrasonic dispersing machine (UT-106H type, manufactured by Sharp Manufacturing Systems Corporation) for 1 hour to prepare a cathode ink (1).

2. Preparation of Electrode Having Catalyst Layer for Fuel Cell

A gas diffusion layer (carbon paper TGP-H-060, manufactured by Toray Industries, Inc.) was immersed in acetone for 30 seconds to perform degreasing. After drying, the layer was immersed in a 10% polytetrafluoroethylene (also referred to as "PTFE" hereinafter) aqueous solution for 30 seconds.

After drying at room temperature, the layer was heated at 350° C. for 1 hour, whereby a gas diffusion layer (also referred to as "GDL" hereinafter) containing PTFE dispersed inside the carbon paper and having water repellency was obtained.

Next, the surface of the GDL having a size of 5 cm×5 cm was coated with the cathode ink (1) prepared in the above 1, at 80° C. by the use of an automatic spray coating device (manufactured by SAN-EI TECH Ltd.). Spray coating was repeatedly carried out to prepare an electrode having a cathode catalyst layer (1) in which the total amount of the catalyst (1) for a fuel cell per unit area was 5 mg/cm$^2$.

3. Preparation of Membrane Electrode Assembly (Also Referred to as "MEA" Hereinafter)

As an electrolyte membrane, a Nafion membrane N-212 (manufactured by DuPont) was used. As a cathode, the electrode having a cathode catalyst layer (1) on a surface of GDL, which had been prepared in the above 2, was used. As an anode, an electrode having an anode catalyst layer (1) on a surface of GDL, which had been prepared in Reference Example 1, was used.

The electrolyte membrane was interposed between the cathode and the anode, and they were subjected to thermo-compression bonding at 140° C. and 3 MPa for 6 minutes using a hot press so that the cathode catalyst layer (1) and the anode catalyst layer (1) might be bonded to the electrolyte membrane, whereby MEA (1) was prepared.

4. Preparation of Unit Cell

The MEA (1) prepared in the above 3 was interposed between two sealing materials (gaskets), two separators each having a gas flow path, two current collectors and two rubber heaters, then fixed with a bolt and clamped so that the contact pressure might become a given pressure (4 N), whereby a unit cell (1) (25 cm$^2$) of a solid polymer type fuel cell was prepared.

5. Evaluation of Power Generation Properties (Measurement of Catalytic Ability)

The unit cell (1) prepared in the above 4, an anode humidifier and a cathode humidifier were temperature-controlled to 90° C., 90° C. and 50° C., respectively. To the anode side, hydrogen was supplied as a fuel at a flow rate of 1 l/min, and to the cathode side, oxygen was supplied as an oxidizing agent at a flow rate of 2 l/min. While applying a back pressure of 300 kPa to both sides, current-voltage properties of the unit cell (1) were measured. From the resulting current-voltage property curve, a maximum output density was calculated. A higher maximum output density indicates a higher catalytic ability in the MEA. The catalytic ability in the MEA (1), that is, the maximum output density was 162 mW/cm$^2$.

The result is set forth in Table 1.

Example 12

Evaluation of Catalyst in MEA

1. Preparation of Ink

A catalyst (12) for a fuel cell was prepared in the same manner as in Example 11, except that the catalyst (6) was used instead of the catalyst (5).

Next, a cathode ink (2) was prepared in the same manner as in Example 11, except that the catalyst (12) for a fuel cell was used instead of the catalyst (11) for a fuel cell.

2. Preparation of Electrode Having Catalyst Layer for Fuel Cell

An electrode having a cathode catalyst layer (2) was prepared in the same manner as in Example 11, except that the cathode ink (2) was used instead of the cathode ink (1).

3. Preparation of MEA

MEA (2) was prepared in the same manner as in Example 11, except that the electrode having a cathode catalyst layer (2) was used instead of the electrode having a cathode catalyst layer (1).

4. Preparation of Unit Cell

A unit cell (2) of a solid polymer type fuel cell was prepared in the same manner as in Example 11, except that the MEA (2) was used instead of the MEA (1).

5. Evaluation of Power Generation Properties (Measurement of Catalytic Ability)

Measurement of current-voltage properties of the unit cell (2) and calculation of a maximum output density were carried out in the same manner as in Example 11, except that the unit cell (2) was used instead of the unit cell (1). The catalytic ability in the MEA (2), that is, the maximum output density was 101 mW/cm$^2$.

The result is set forth in Table 1.

Comparative Example 7

Evaluation of Catalyst in MEA

1. Preparation of Ink

A catalyst (13) for a fuel cell was prepared in the same manner as in Example 11, except that the catalyst (9) was used instead of the catalyst (5).

To a mixed solution of 25 ml of 2-propanol (manufactured by Wako Pure Chemical Industries, Ltd.) and 25 ml of distilled water, 0.355 g of the catalyst (13) and 0.08875 g of carbon black (Ketjen Black EC300J, manufactured by Lion Corporation) were added, then 4.67 g of an aqueous solution (Nafion 5% aqueous solution, manufactured by Wako Pure Chemical Industries, Ltd.) containing a proton conductive material (NAFION (registered trademark)) was further added, and they were mixed by an ultrasonic dispersing machine (UT-106H type, manufactured by Sharp Manufacturing Systems Corporation) for 1 hour to prepare a cathode ink (3).

2. Preparation of Electrode Having Catalyst Layer for Fuel Cell

An electrode having a cathode catalyst layer (3) in which the total amount of the catalyst (13) and carbon black per unit area was 5 mg/cm$^2$ was prepared in the same manner as in Example 11, except that the cathode ink (3) was used instead of the cathode ink (1).

3. Preparation of MEA

MEA (3) was prepared in the same manner as in Example 11, except that the electrode having a cathode catalyst layer (3) was used instead of the electrode having a cathode catalyst layer (1).

4. Preparation of Unit Cell

A unit cell (3) of a solid polymer type fuel cell was prepared in the same manner as in Example 11, except that the MEA (3) was used instead of the MEA (1).

5. Evaluation of Power Generation Properties (Measurement of Catalytic Ability)

Measurement of current-voltage properties of the unit cell (3) and calculation of a maximum output density were carried out in the same manner as in Example 11, except that the unit cell (3) was used instead of the unit cell (1). The catalytic ability in the MEA (3), that is, the maximum output density was 76 mW/cm$^2$.

The result is set forth in Table 1.

Comparative Example 8

Evaluation of Catalyst in MEA

1. Preparation of Ink

A catalyst (14) for a fuel cell was prepared in the same manner as in Example 11, except that the catalyst (10) was used instead of the catalyst (5).

Next, a cathode ink (4) was prepared in the same manner as in Comparative Example 7, except that the catalyst (14) for a fuel cell was used instead of the catalyst (13) for a fuel cell.

2. Preparation of Electrode Having Catalyst Layer for Fuel Cell

An electrode having a cathode catalyst layer (4) was prepared in the same manner as in Example 11, except that the cathode ink (4) was used instead of the cathode ink (1).

3. Preparation of MEA

MEA (4) was prepared in the same manner as in Example 11, except that the electrode having a cathode catalyst layer (4) was used instead of the electrode having a cathode catalyst layer (1).

4. Preparation of Unit Cell

A unit cell (4) of a solid polymer type fuel cell was prepared in the same manner as in Example 11, except that the MEA (4) was used instead of the MEA (1).

5. Evaluation of Power Generation Properties (Measurement of Catalytic Ability)

Measurement of current-voltage properties of the unit cell (4) and calculation of a maximum output density were carried out in the same manner as in Example 11, except that the unit cell (4) was used instead of the unit cell (1). The catalytic ability in the MEA (4), that is, the maximum output density was 53 mW/cm$^2$.

The result is set forth in Table 1.

Example 13

Evaluation of Catalyst in MEA

The effect of iron as a second metal was verified.

1. Preparation of Ink

A catalyst (15) for a fuel cell was prepared in the same manner as in Example 11, except that the catalyst (1) was used instead of the catalyst (5).

Next, a cathode ink (5) was prepared in the same manner as in Example 11, except that the catalyst (15) for a fuel cell was used instead of the catalyst (11) for a fuel cell.

2. Preparation of Electrode Having Catalyst Layer for Fuel Cell

An electrode having a cathode catalyst layer (5) was prepared in the same manner as in Example 11, except that the cathode ink (5) was used instead of the cathode ink (1).

3. Preparation of MEA

MEA (5) was prepared in the same manner as in Example 11, except that the electrode having a cathode catalyst layer (5) was used instead of the electrode having a cathode catalyst layer (1).

4. Preparation of Unit Cell

A unit cell (5) of a solid polymer type fuel cell was prepared in the same manner as in Example 11, except that the MEA (5) was used instead of the MEA (1).

5. Evaluation of Power Generation Properties (Measurement of Catalytic Ability)

Measurement of current-voltage properties of the unit cell (5) and calculation of a maximum output density were carried out in the same manner as in Example 11, except that the unit cell (5) was used instead of the unit cell (1). The catalytic ability in the MEA (5), that is, the maximum output density was 688 mW/cm$^2$.

The result is set forth in Table 1.

Example 14

Evaluation of Catalyst in MEA

The effect of iron as a second metal was verified.

1. Preparation of Ink

A catalyst (16) for a fuel cell was prepared in the same manner as in Example 11, except that the catalyst (2) was used instead of the catalyst (5).

Next, a cathode ink (6) was prepared in the same manner as in Example 11, except that the catalyst (16) for a fuel cell was used instead of the catalyst (11) for a fuel cell.

2. Preparation of Electrode Having Catalyst Layer for Fuel Cell

An electrode having a cathode catalyst layer (6) was prepared in the same manner as in Example 11, except that the cathode ink (6) was used instead of the cathode ink (1).

3. Preparation of MEA

MEA (6) was prepared in the same manner as in Example 11, except that the electrode having a cathode catalyst layer (6) was used instead of the electrode having a cathode catalyst layer (1).

4. Preparation of Unit Cell

A unit cell (6) of a solid polymer type fuel cell was prepared in the same manner as in Example 11, except that the MEA (6) was used instead of the MEA (1).

5. Evaluation of Power Generation Properties (Measurement of Catalytic Ability)

Measurement of current-voltage properties of the unit cell (6) and calculation of a maximum output density were carried out in the same manner as in Example 11, except that the unit cell (6) was used instead of the unit cell (1). The catalytic ability in the MEA (6), that is, the maximum output density was 742 mW/cm$^2$.

The result is set forth in Table 1.

Example 15

Evaluation of Catalyst in MEA

The effect of iron as a second metal was verified.
1. Preparation of Ink

A catalyst (17) for a fuel cell was prepared in the same manner as in Example 11, except that the catalyst (3) was used instead of the catalyst (5).

Next, a cathode ink (7) was prepared in the same manner as in Example 11, except that the catalyst (17) for a fuel cell was used instead of the catalyst (11) for a fuel cell.

2. Preparation of Electrode Having Catalyst Layer for Fuel Cell

An electrode having a cathode catalyst layer (7) was prepared in the same manner as in Example 11, except that the cathode ink (7) was used instead of the cathode ink (1).

3. Preparation of MEA

MEA (7) was prepared in the same manner as in Example 11, except that the electrode having a cathode catalyst layer (7) was used instead of the electrode having a cathode catalyst layer (1).

4. Preparation of Unit Cell

A unit cell (7) of a solid polymer type fuel cell was prepared in the same manner as in Example 11, except that the MEA (7) was used instead of the MEA (1).

5. Evaluation of Power Generation Properties (Measurement of Catalytic Ability)

Measurement of current-voltage properties of the unit cell (7) and calculation of a maximum output density were carried out in the same manner as in Example 11, except that the unit cell (7) was used instead of the unit cell (1). The catalytic ability in the MEA (7), that is, the maximum output density was 643 mW/cm$^2$.

The result is set forth in Table 1.

Comparative Example 9

Evaluation of Catalyst in MEA

1. Preparation of Ink

A catalyst (18) for a fuel cell was prepared in the same manner as in Example 11, except that the catalyst (7) was used instead of the catalyst (5).

Next, a cathode ink (8) was prepared in the same manner as in Comparative Example 7, except that the catalyst (18) for a fuel cell was used instead of the catalyst (13) for a fuel cell.

2. Preparation of Electrode Having Catalyst Layer for Fuel Cell

An electrode having a cathode catalyst layer (8) was prepared in the same manner as in Example 11, except that the cathode ink (8) was used instead of the cathode ink (1).

3. Preparation of MEA

MEA (8) was prepared in the same manner as in Example 11, except that the electrode having a cathode catalyst layer (8) was used instead of the electrode having a cathode catalyst layer (1).

4. Preparation of Unit Cell

A unit cell (8) of a solid polymer type fuel cell was prepared in the same manner as in Example 11, except that the MEA (8) was used instead of the MEA (1).

5. Evaluation of Power Generation Properties (Measurement of Catalytic Ability)

Measurement of current-voltage properties of the unit cell (8) and calculation of a maximum output density were carried out in the same manner as in Example 11, except that the unit cell (8) was used instead of the unit cell (1). The catalytic ability in the MEA (8), that is, the maximum output density was 520 mW/cm$^2$.

The result is set forth in Table 1.

Example 16

Evaluation of Catalyst in MEA

The effect of chromium as a second metal was verified.
1. Preparation of Ink

A catalyst (19) for a fuel cell was prepared in the same manner as in Example 11, except that the catalyst (4) was used instead of the catalyst (5).

Next, a cathode ink (9) was prepared in the same manner as in Example 11, except that the catalyst (19) for a fuel cell was used instead of the catalyst (11) for a fuel cell.

2. Preparation of Electrode Having Catalyst Layer for Fuel Cell

An electrode having a cathode catalyst layer (9) was prepared in the same manner as in Example 11, except that the cathode ink (9) was used instead of the cathode ink (1).

3. Preparation of MEA

MEA (9) was prepared in the same manner as in Example 11, except that the electrode having a cathode catalyst layer (9) was used instead of the electrode having a cathode catalyst layer (1).

4. Preparation of Unit Cell

A unit cell (9) of a solid polymer type fuel cell was prepared in the same manner as in Example 11, except that the MEA (9) was used instead of the MEA (1).

5. Evaluation of Power Generation Properties (Measurement of Catalytic Ability)

Measurement of current-voltage properties of the unit cell (9) and calculation of a maximum output density were carried out in the same manner as in Example 11, except that the unit cell (9) was used instead of the unit cell (1). The catalytic ability in the MEA (9), that is, the maximum output density was 532 mW/cm$^2$.

The result is set forth in Table 1.

Comparative Example 10

Evaluation of Catalyst in MEA

1. Preparation of Ink

A catalyst (20) for a fuel cell was prepared in the same manner as in Example 11, except that the catalyst (8) was used instead of the catalyst (5).

Next, a cathode ink (10) was prepared in the same manner as in Comparative Example 7, except that the catalyst (20) for a fuel cell was used instead of the catalyst (13) for a fuel cell.

2. Preparation of Electrode Having Catalyst Layer for Fuel Cell

An electrode having a cathode catalyst layer (10) was prepared in the same manner as in Example 11, except that the cathode ink (10) was used instead of the cathode ink (1).

3. Preparation of MEA

MEA (10) was prepared in the same manner as in Example 11, except that the electrode having a cathode catalyst layer (10) was used instead of the electrode having a cathode catalyst layer (1).

4. Preparation of Unit Cell

A unit cell (10) of a solid polymer type fuel cell was prepared in the same manner as in Example 11, except that the MEA (10) was used instead of the MEA (1).

5. Evaluation of Power Generation Properties (Measurement of Catalytic Ability)

Measurement of current-voltage properties of the unit cell (10) and calculation of a maximum output density were carried out in the same manner as in Example 11, except that the unit cell (10) was used instead of the unit cell (1). The catalytic ability in the MEA (10), that is, the maximum output density was 342 mW/cm².

The result is set forth in Table 1.

Reference Example 1

1. Preparation of Anode Ink

To 50 ml of pure water, 0.6 g of Pt-supported carbon (TEC10E60E, manufactured by Tanaka Kikinzoku Kogyo K.K.) was added, then 5 g of an aqueous solution (Nafion 5% aqueous solution, manufactured by Wako Pure Chemical Industries, Ltd.) containing a proton conductive material (NAFION (registered trademark): 0.25 g) was further added, and they were mixed by an ultrasonic dispersing machine (UT-106H type, manufactured by Sharp Manufacturing Systems Corporation) for 1 hour to prepare an anode ink (1).

2. Preparation of Electrode Having Anode Catalyst Layer

A gas diffusion layer (carbon paper TGP-H-060, manufactured by Toray Industries, Inc.) was immersed in acetone for 30 seconds to perform degreasing. After drying, the layer was immersed in a 10% polytetrafluoroethylene (also referred to as "PTFE" hereinafter) aqueous solution for 30 seconds. After drying at room temperature, the layer was heated at 350° C. for 1 hour, whereby a gas diffusion layer (also referred to as "GDL" hereinafter) containing PTFE dispersed inside the carbon paper and having water repellency was obtained.

Next, the surface of the GDL having a size of 5 cm×5 cm was coated with the anode ink (1) prepared in the above 1, at 80° C. by the use of an automatic spray coating device (manufactured by SAN-EI TECH Ltd.). Spray coating was repeatedly carried out to prepare an electrode having an anode catalyst layer (1) in which the amount of Pt per unit area was 1 mg/cm².

TABLE 1

Blending ratios of catalyst raw material components in each example and maximum output density in MEA

| | Type of catalyst | Nitrogen-containing organic substance A (mol) | Metal salt B (mol) | A/B | Carbon black C (mol) | C/B | Maximum output density (mW/cm²) |
|---|---|---|---|---|---|---|---|
| Ex. 11 | (5) | 0.046 | 0.012 | 4 | 0.089 | 7.4 | 162 |
| Ex. 12 | (6) | 0.046 | 0.012 | 4 | 0.089 | 7.4 | 101 |
| Comp. Ex. 7 | (9) | 0.046 | 0.012 | 4 | 0 | 0 | 76 |
| Comp. Ex. 8 | (10) | 0.046 | 0.012 | 4 | 0 | 0 | 53 |
| Ex. 13 | (1) | 0.046 | 0.013 | 3.5 | 0.059 | 4.5 | 688 |
| Ex. 14 | (2) | 0.046 | 0.013 | 3.5 | 0.089 | 6.8 | 742 |
| Ex. 15 | (3) | 0.046 | 0.013 | 3.5 | 0.118 | 8.9 | 643 |
| Comp. Ex. 9 | (7) | 0.046 | 0.013 | 3.5 | 0 | 0 | 520 |
| Ex. 16 | (4) | 0.023 | 0.013 | 1.8 | 0.089 | 6.8 | 532 |
| Comp. Ex. 10 | (8) | 0.023 | 0.013 | 1.8 | 0 | 0 | 342 |

From the results of the examples and the comparative examples, it can be seen that by mixing carbon black in a specific ratio in addition to the nitrogen-containing organic substance and the metal salt to prepare a catalyst raw material and then preparing a catalyst using the catalyst raw material, the maximum output density obtained from the current-potential property curve was increased.

The invention claimed is:

1. A production process for an electrode catalyst for a fuel cell, comprising a step (I) of mixing one or more kinds selected from the group consisting of alanine, arginine, asparagine, asparagic acid, cystine, glutamine, glutamic acid, glycine, histidine, isoleucine, leucine, lysine, methionine, phenylalanine, serine, threonine, tryptophan, tyrosine, valine, norvaline, glycylglycine, triglycine, tetraglycine and ethylenediamine/dihydrochloride, a metal alkoxide and conductive particles with a solvent and a step (II) of calcining a mixture obtained in the step (I).

2. The production process for an electrode catalyst for a fuel cell as claimed in claim 1, wherein the conductive particle is carbon black.

3. The production process for an electrode catalyst for a fuel cell as claimed in claim 2, wherein the molar ratio of carbon black to the total sum of the metal alkoxide in the step (I) is 1 to 15.

4. The production process for an electrode catalyst for a fuel cell as claimed in claim 1, wherein the molar ratio of the one or more kinds selected from the group consisting of alanine, arginine, asparagine, asparagic acid, cystine, glutamine, glutamic acid, glycine, histidine, isoleucine, leucine, lysine, methionine, phenylalanine, serine, threonine, tryptophan, tyrosine, valine, norvaline, glycylglycine, triglycine, tetraglycine and ethylenediamine/dihydrochloride to the total sum of the metal alkoxide in the step (I) is 0.1 to 10.

5. The production process for an electrode catalyst for a fuel cell as claimed in claim 1, wherein the metal of the metal alkoxide is at least one metal selected from the group consisting of titanium, vanadium, chromium, manganese, iron, cobalt, copper, zirconium, niobium, tantalum and tungsten.

6. The production process for an electrode catalyst for a fuel cell as claimed in claim 1, wherein the metal alkoxide is a compound of at least two transition metals, and one of the transition metals is selected from the group consisting of titanium, zirconium, niobium and tantalum, and the other is selected from the group consisting of vanadium, chromium, manganese, iron, cobalt, copper and tungsten.

7. The production process for an electrode catalyst for a fuel cell as claimed in claim 1, wherein the step (I) is a step in which the one or more kinds selected from the group consisting of alanine, arginine, asparagine, asparagic acid, cystine, glutamine, glutamic acid, glycine, histidine, isoleucine, leucine, lysine, methionine, phenylalanine, serine, threonine, tryptophan, tyrosine, valine, norvaline, glycylglycine, triglycine, tetraglycine and ethylenediamine/dihydrochloride, the metal alkoxide and the conductive particles are mixed with the solvent to obtain a catalyst precursor mixed liquid, and thereafter, the solvent is removed from the catalyst precursor mixed liquid to obtain the mixture.

8. The production process for an electrode catalyst for a fuel cell as claimed in claim 7, wherein a suspending agent comprising a compound having a diketone structure is mixed with the catalyst precursor mixed liquid.

9. The production process for an electrode catalyst for a fuel cell as claimed in claim 8, wherein the step (I) is a step in which a solution obtained by mixing the metal alkoxide with the solvent is mixed with the suspending agent, subsequently mixed with the one or more kinds selected from the group consisting of alanine, arginine, asparagine, aspargic acid, cystine, glutamine, glutamic acid, glycine, histidine, isoleucine, leucine, lysine, methionine, phenylalanine, serine, threonine, tryptophan, tyrosine, valine, norvaline, glycylglycine, triglycine, tetraglycine and ethylenediamine/dihydrochloride and then mixed with the conductive particles to obtain the catalyst precursor mixed liquid, and thereafter, the solvent is removed from the catalyst precursor mixed liquid to obtain the mixture.

10. The production process for an electrode catalyst for a fuel cell as claimed in claim 1, wherein the metal alkoxide is a transition metal compound containing an oxygen atom in a molecule.

11. An electrode catalyst for a fuel cell, obtained by the production process as claimed in claim 1.

12. A catalyst layer for a fuel cell, comprising the electrode catalyst for a fuel cell as claimed in claim 11.

13. An electrode having the catalyst layer for a fuel cell as claimed in claim 12 and a gas diffusion layer.

14. A membrane electrode assembly comprising a cathode, an anode and an electrolyte membrane arranged between the cathode and the anode, wherein the cathode and/or the anode is the electrode as claimed in claim 13.

15. A fuel cell having the membrane electrode assembly as claimed in claim 14.

16. A solid polymer type fuel cell having the membrane electrode assembly as claimed in claim 14.

* * * * *